United States Patent
Hartung et al.

(10) Patent No.: US 10,894,675 B2
(45) Date of Patent: Jan. 19, 2021

(54) ROTORS FOR LONG-STATOR LINEAR MOTOR SYSTEMS, HAVING A LOW-WEAR MOUNTING ARRANGEMENT

(71) Applicant: Krones AG, Neutraubling (DE)

(72) Inventors: Alexander Hartung, Rohrdorf (DE); Heiner Schaefer, Munich (DE); Peter Zeiner, Raubling (DE); Konrad Senn, Alteglofsheim (DE); Torsten Kilgenstein, Neumarkt (DE); Stefan Elsperger, Soechtenau (DE); Michael Neubauer, Grassau (DE); Manfred Kieslinger, Stephanskirchen (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/479,909

(22) PCT Filed: Sep. 29, 2017

(86) PCT No.: PCT/EP2017/074759
§ 371 (c)(1),
(2) Date: Jul. 22, 2019

(87) PCT Pub. No.: WO2018/137796
PCT Pub. Date: Aug. 2, 2018

(65) Prior Publication Data
US 2019/0367297 A1    Dec. 5, 2019

(30) Foreign Application Priority Data

Jan. 27, 2017  (DE) ........................ 10 2017 201 310

(51) Int. Cl.
*B65G 54/02*    (2006.01)
*H02K 7/08*    (2006.01)
(Continued)

(52) U.S. Cl.
CPC ............... *B65G 54/02* (2013.01); *H02K 7/08* (2013.01); *H02K 41/025* (2013.01); *H02K 41/031* (2013.01)

(58) Field of Classification Search
CPC ...................................................... B65G 54/02
(Continued)

(56) References Cited

U.S. PATENT DOCUMENTS 4,026,572 A    5/1977  Yoshioka
4,718,349 A *  1/1988  Wahren ................. B65G 19/02
                                           104/165

(Continued)

FOREIGN PATENT DOCUMENTS

EP    0597416 A1    5/1994
EP    0636561 A1    2/1995
(Continued)

OTHER PUBLICATIONS

International Search Report and Written Opinion of International Application No. PCT/EP2017/074759 dated May 15, 2018, with English Search Report, 21 pages.

*Primary Examiner* — Douglas A Hess
(74) *Attorney, Agent, or Firm* — Lowenstein Sandler LLP

(57) ABSTRACT

The present disclosure provides rotors for long-stator linear motor systems, having at least two rollers for mounting the rotors on parallel guide rails of the long-stator linear motor system, wherein the rotors comprise at least one rotatable bolster, on which at least one roller, in particular at least one pair of rollers, of the at least two rollers is rotatably mounted, and/or at least one roller with a steering rotational axis with integrated castor, wherein the roller is mounted on a roller axle by means of a bolt, via an asymmetric and/or
(Continued)

sloping bore, and further comprises a pendulum ring which is mounted on the bolt and has an external ball or slide bearing.

20 Claims, 14 Drawing Sheets

(51) Int. Cl.
*H02K 41/025* (2006.01)
*H02K 41/03* (2006.01)

(58) Field of Classification Search
USPC .......................................................... 198/619
See application file for complete search history.

(56) References Cited

U.S. PATENT DOCUMENTS

| | | | | |
|---|---|---|---|---|
| 4,825,111 A * | 4/1989 | Hommes | ............... | H02K 41/02 310/12.15 |
| 5,253,969 A * | 10/1993 | Richert | ................... | C23G 3/02 198/619 |
| 6,876,107 B2 * | 4/2005 | Jacobs | ................ | H02K 11/215 310/12.19 |
| 7,478,749 B2 * | 1/2009 | Clothier | ................ | B65G 54/02 235/383 |
| 9,604,795 B2 * | 3/2017 | Aumann | ................ | B65G 54/02 |
| 10,196,073 B2 * | 2/2019 | Pruessmeier | ........ | H02K 41/031 |
| 10,336,559 B2 * | 7/2019 | Koga | ....................... | B61B 13/00 |
| 10,618,749 B2 * | 4/2020 | Clossner | ................ | B65G 54/00 |
| 10,647,457 B2 * | 5/2020 | Hutter | ..................... | B65B 21/14 |
| 2003/0230941 A1 | 12/2003 | Jacobs | | |
| 2005/0256774 A1 | 11/2005 | Clothier et al. | | |
| 2011/0085924 A1 * | 4/2011 | Shampine et al. | | |
| 2012/0031741 A1 | 2/2012 | Ishino et al. | | |
| 2016/0325761 A1 | 11/2016 | Pruessmeier | | |

FOREIGN PATENT DOCUMENTS

| | | |
|---|---|---|
| EP | 3078617 A1 | 10/2016 |
| JP | 2004051045 A | 2/2004 |
| KR | 20140014529 A | 2/2014 |

* cited by examiner

ROTORS FOR LONG-STATOR LINEAR
MOTOR SYSTEMS, HAVING A LOW-WEAR
MOUNTING ARRANGEMENT

RELATED APPLICATIONS

This application is a National Stage of International Application No. PCT/EP2017/074759 filed Sep. 29, 2017, which claims the benefit of German Patent Application 10 2017 201 310.9 filed Jan. 27, 2017, both of which are incorporated by reference herein.

FIELD OF THE INVENTION

The present disclosure refers to rotors for long-stator linear motor systems having a particularly low-wear mounting arrangement.

BACKGROUND

Rotors, carriages, shuttles or movers, which are moved individually along a transport path by means of a long-stator linear motor, are known in a wide variety of designs. The rotors are often supported by track rollers on guide rails on which the rolling surfaces of the track rollers roll. The propulsion of the rotors is here effected by magnetic interaction between the electromagnets and/or permanent magnets of the long stator arranged along the transport path and the secondary part of the rotors provided with corresponding magnets.

Depending on the application of the rotors or the long-stator linear motor system, the transport path is of a generally closed configuration. Therefore, in addition to straight sections, the transport path and thus the guide rails or running rails also have curved sections, i.e. curved pieces.

With conventional rotors, the roller axles with which the track rollers are rotatably mounted on the rotors are made rigid in their alignment. FIG. 1, for example, illustrates such a development, which shows a rotor 100 and a long-stator linear motor of the prior art. The rotor 100, designed with a secondary part 120, is supported by a plurality of rollers 110 on upper guide rails 150 and lower guide rails 155, respectively. For the sake of clarity, FIG. 1 shows only the rear guide rail of the upper and lower guide rail pairs 150 and 155 respectively. The rotor 100 has two pairs of rollers for each pair of guide rails, which allow the rotor to be movably mounted along the guide rails from below and above on the respective pair of guide rails. As shown in FIG. 1, the rollers 110 are fixed to the rotor 100 with a rigid roller axle, i.e. one that is fixed in space with respect to the rotor 100.

In addition to the secondary part 120, the rotor 100 shown here by way of example also comprises a holding device 125, for example in the form of a neck handling clamp for transporting bottles. The magnets of the secondary part 120 interact with the generally individually controllable coils or electromagnets of the long stator 160, which is just shown schematically in FIG. 1 for the sake of simplicity. In addition to the long stator shown, the long-stator linear motor system generally comprises another long stator opposite the long stator 160 shown. Due to the magnetic interaction with the long stators, the rotor 100 is moved in a targeted manner along the guide rails. The rotor is held securely between the guide rails via the rollers 110 acting on the upper and lower guide rails 150 and 155 respectively.

As shown in FIG. 2, the transport path of a long-stator linear motor system generally has straight sections A as well as curved pieces B, along which the guide rails 150 and 155 are curved with a certain curve radius. In the rigid configuration of the roller axles of the exemplary roller pair 110-1 shown, however, a so-called tracking error occurs during cornering. While the roller axle of the track rollers 110 in the straight section of the transport path shown in FIG. 1 is aligned perpendicular to the direction of travel or running direction, it deviates from this alignment when cornering as shown in FIG. 3.

The alignment of the roller, i.e. the running direction given by the rigid rotation axis, is indicated as a vector R in FIG. 3 as an example. In addition, the direction of travel, which is given by the course of the guide rails 150 or 155, or more precisely by a tangent to the guide rails, is shown as vector K. Since the alignment R of the roller and the direction of travel K deviate from each other during cornering, the roller 110-1 can no longer roll correctly. Rather, the result is a tracking error α, which is represented as an angle between the vectors R and K. This means that the roller 110-1 can no longer roll correctly in a straight line, but is additionally shifted sideways. This results in a sliding friction component on the running surface of the roller, which leads to premature wear of the rollers. The effect is similar to an incorrectly set track in a car.

Rotors can have carrier rollers that absorb part of the vertically aligned gravity as well as guide rollers that only absorb horizontal forces. The guide rollers are therefore substantially force-free when traveling straight ahead, apart from a possibly unilateral stator normal force, and are only loaded with centrifugal forces during cornering. In the case of rollers whose axes of rotation or roller axles are aligned parallel or obliquely to the plane of movement or guide plane, to which the carrier rollers also belong, slippage occurs during cornering, so-called grinding, since the axes of rotation are not aligned with the center of the curve radius of the guide rail. This incorrect rolling leads to increased wear of the rollers and the guide rail, respectively. However, slippage or grinding also occurs with guide rollers whose roller axles are aligned parallel or obliquely to the plane of movement. For better differentiation, all rollers whose roller axle has a parallel component, regardless of whether they absorb part of the force of gravity, are therefore referred to as track rollers in the following, while rollers whose roller axle is aligned perpendicular to the plane of movement are referred to as (pure) guide rollers.

The situation is shown in FIG. 4, which shows an alternative design of a rotor and a transport path according to the prior art. In the configuration shown in FIG. 4, two guide rails 250 and 255 are arranged vertically one above the other, each having a straight portion A and a curved piece B. The rotor 200 is supported on the guide rails via track rollers 210 as well as via guide rollers 212. In the further development shown, the rotational axis of the track rollers 210 is aligned parallel to the plane of movement or guide plane, while the rotational axis of the guide rollers 212 is aligned perpendicular to the plane of movement or guide plane.

Here and in the following, the plane of movement or guide plane is always understood to be the plane in which the rotors are moved. Here it is assumed that the entire transport path or the considered section of the transport path is arranged in one plane. In particular, the curves described by the guide rails and their curve radius lie in the movement plane or guide plane. In the case of parallel-guided guide rails which are curved in the plane they span, this plane thereby corresponds to the plane of movement or guide plane.

The above-mentioned slip or deviation of the rolling direction R from the travel direction K generally occurs with rollers whose axis of rotation has at least one component parallel to the plane of movement or guide plane, i.e. which is aligned obliquely or parallel to the plane of movement or guide plane. The greater this component or the more parallel the axis of rotation is to the plane of movement, the greater the increased wear that occurs. Thus the wear on the vertical carrier rollers 210 shown in FIG. 4 is particularly high.

It is thus the object of the present invention to provide rotors and a long-stator linear motor system which enable improved rolling behavior and thus reduced wear. In particular, the above-mentioned grinding of the track rollers during cornering should be avoided. In general, this invention is based on the object to provide a transport system with improved service life and reduced maintenance requirements.

DETAILED DESCRIPTION

Figure 1:
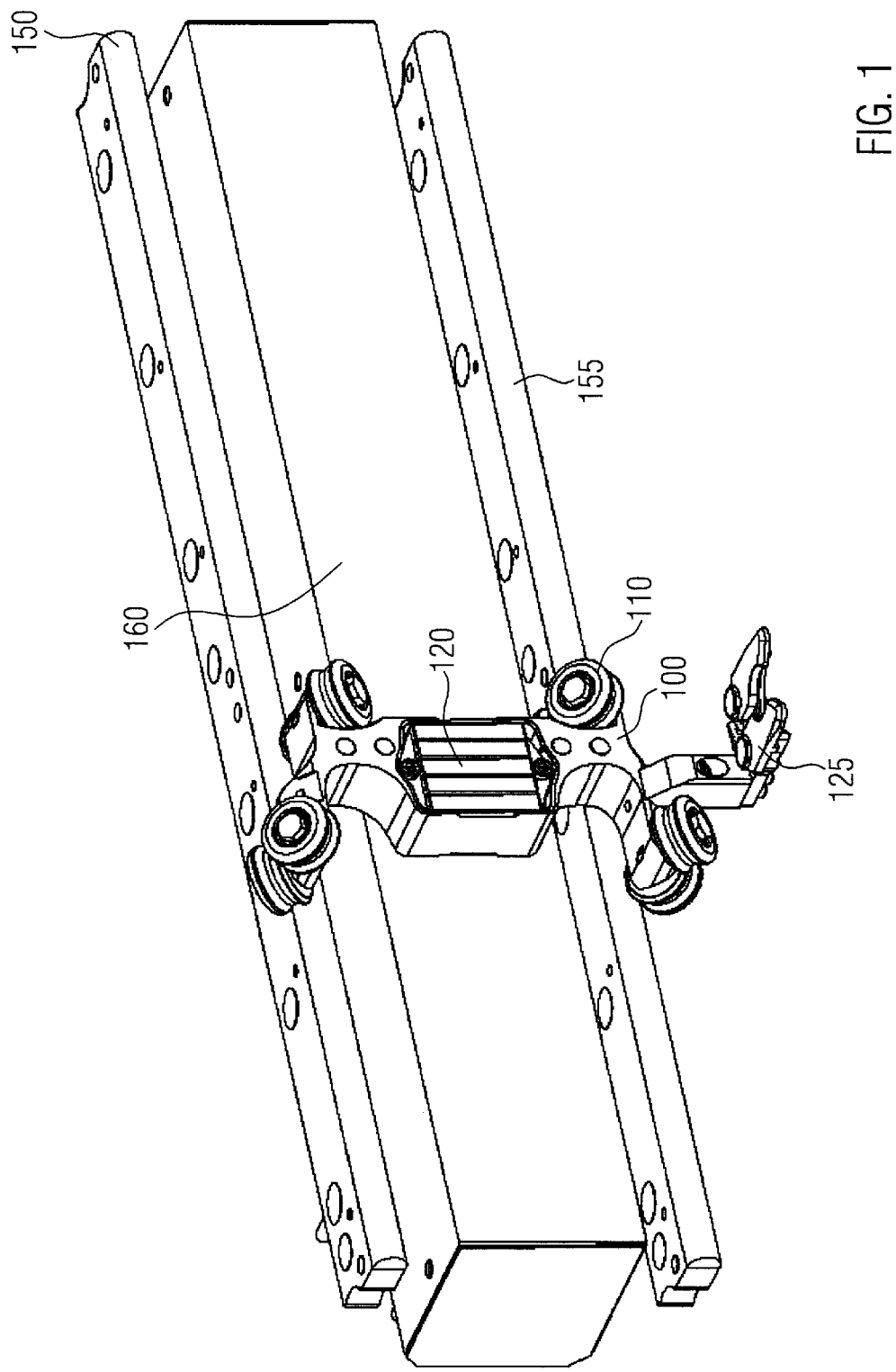
FIG. 1 shows a schematic diagram of a long-stator linear motor system with a rotor of the prior art.
Figure 2:
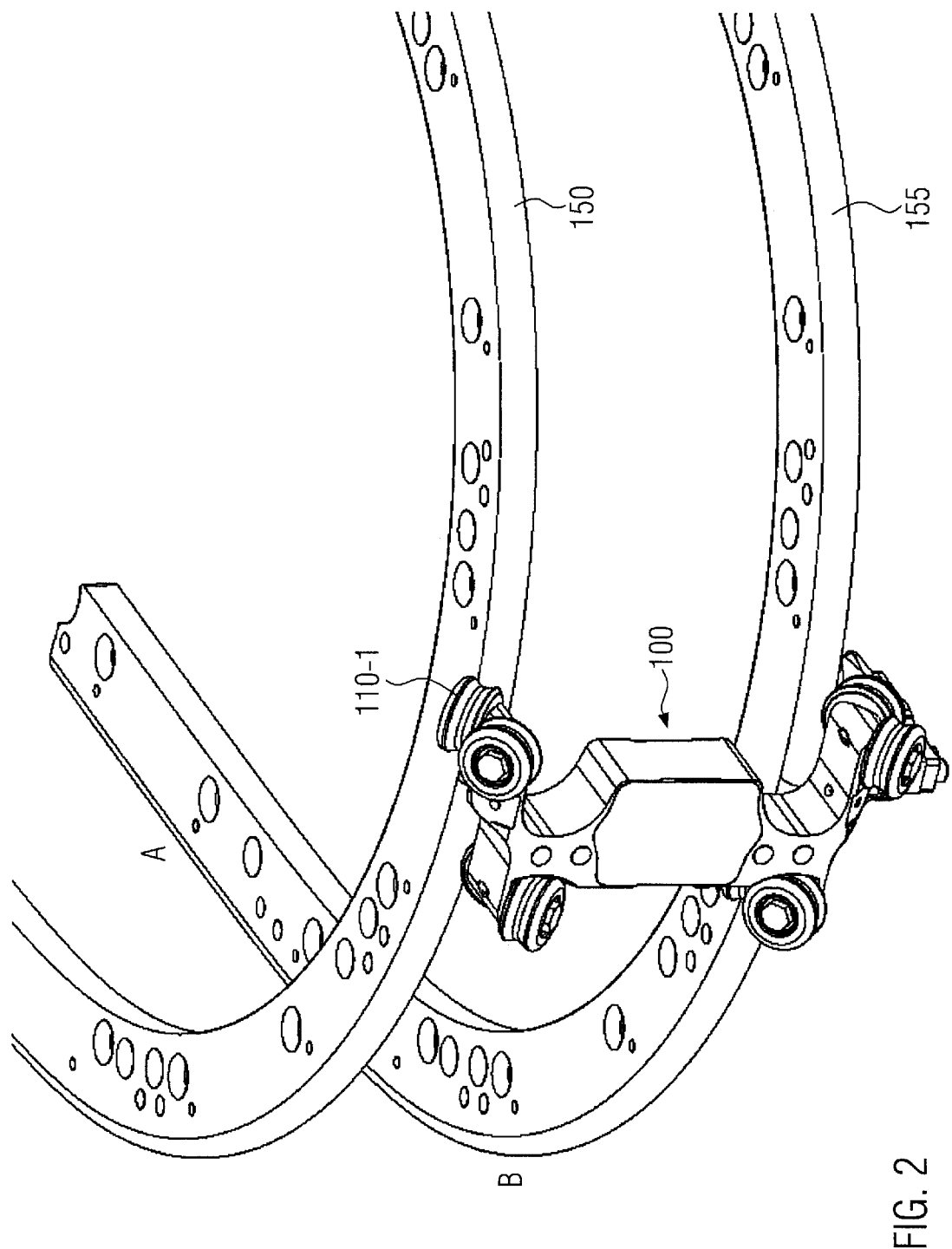
FIG. 2 shows the rotor of the prior art during cornering.

The above-mentioned objects are achieved in embodiments by a rotor for a long-stator linear motor system, the rotor comprising at least two rollers for supporting the rotor on parallel guide rails of the long-stator linear motor system, and further comprising at least one rotatable bolster on which at least one roller, in particular at least one pair of rollers, of the at least two rollers is rotatably mounted, and/or has at least one roller with a steering rotational axis with integrated castor, wherein the roller is mounted on a roller axle by means of a bolt via an asymmetrical and/or oblique bore and further has a pendulum ring mounted on the bolt and having an external ball or slide bearing.

According to the Ackermann principle, when cornering, the extensions of all wheel axles should intersect approximately at the center of the curve. In the case of roller axles or rotation axes of the rollers aligned obliquely relative to the plane of movement, this principle applies to the component of the rotation axes aligned parallel to the plane of movement. A tracking error can thus be avoided by selecting the positions of the axes of rotation depending on the curve radius of the guide rails. In the ideal case, the position of each track roller of the rotors is always such that the parallel components of the rotation axes, i.e. the projection of the rotation axes onto the movement plane or guide plane, intersect at the center of the curve. If the radius of the curve varies, this should always apply to the curved piece occupied by the rotor.

This disclosure presents two possible alternative solutions that can also be combined with one another.

On the one hand, two track rollers of the rotor can be rotatably mounted on a rotatable bolster of the rotor as a pair of rollers. When one roller of the pair of rollers is mounted on a first guide rail and the other roller of the pair of rollers is mounted on a second guide rail, wherein the first and second guide rails span the plane of movement, i.e. the guide plane, the rotatability of the rotatable bolster causes the parallel components of the rotation axes of the pair of rollers to seek to align in the direction of the radius of the curve, i.e. towards the center of the curve. For this purpose, the rotatable bolster can be designed to be rotatable about an axis perpendicular to the plane of movement or guide plane, for example by being mounted on the rotor by means of a bolt, the so-called kingpin.

According to a further development, in which the rotors are only arranged on one side of vertically superimposed guide rails, individual rollers can also be rotatably mounted on the rotatable bolsters according to the invention. Here, too, the rotatable bolsters can be designed to be rotatable about an axis perpendicular to the plane of movement or the guide plane, wherein the plane of movement or the guide plane is no longer spanned by the guide rails, but rather aligned perpendicular to the plane spanned by the guide rails. Finally, further developments with more than one pair of rollers per rotatable bolster are also conceivable.

Alternatively or in addition, at least one track roller of the rotor can be individually steerable and equipped with a steering rotational axis with integrated castor. According to the invention, this can be realized by the roller being mounted on a roller axle by means of a bolt via an asymmetrical and/or inclined bore and furthermore comprising a pendulum ring mounted on the bolt with an external ball or slide bearing. The bore is provided transverse to the roller axle, whereby the bore is made eccentric through the roller axle and/or oblique to the plane of movement.

The distance in the longitudinal direction between the track point, i.e. the penetration point of the axis of the above-mentioned bolt through the lane surface, i.e. through the plane of movement, and the wheel contact point, i.e. the center of the roller contact surface, is referred to as castor or castor section. As the bolt is mounted on the fixed, i.e. non-rotatable, roller axle via an asymmetrical bore, i.e. a bore which does not pass centrally through the roller axle on which the roller is mounted, and/or an inclined bore, i.e. a bore which does not pass in a direction perpendicular to the plane of movement through the roller axle, a castor occurs between the track point and the wheel contact point of the corresponding roller according to the invention. The bore is arranged in the desired direction of travel in front of the center of the roller axle and/or inclined obliquely so that the penetration point of the axis of the bolt through the plane of movement is located in front of the wheel contact point so that a positive castor occurs. As is for example known from the wheels of shopping carts, this castor restores the position of the wheel in the event of a steering deflection due to the torque that occurs. Conversely, as a consequence of the tracking error described above, a torque occurs when cornering, which automatically aligns the roller equipped with the castor in the direction of travel.

According to embodiments of the present disclosure, however, the roller is not equipped with the external construction of the steering rotational axis usual in shopping carts, but with an integrated castor. This means here and in the following that a pendulum ring is mounted on the bolt described above, which pendulum ring has an external ball or slide bearing. The pendulum ring is designed in such a way that it can oscillate around the straight position within a specified angular range, so that the roller can follow the alignment of the guide rail or curve within this angular range. For this purpose, the pendulum ring is also eccentrically and/or obliquely mounted on the bolt. Since the pendulum ring according to the invention comprises an external ball or slide bearing, no external bearing of the steering rotational axis is required for the castor of the steering rotational axis according to the invention. Instead, an outer ring with which the roller stands up or is supported on the guide rail or lane can roll or slide directly on the ball or slide bearing. As the pendulum ring can be pivoted relative to the rigid roller axle, the current rotation axis around which the outer ring rolls or slides on the ball or slide bearing can thus deviate from the rigid roller axle. By providing the pendulum ring which is pivotably and eccentrically and/or obliquely mounted, an integrated castor can thus be achieved which always seeks to align the roller in the direction of travel. The design according to the embodiments of the disclosure is therefore much more compact than steering rotational axes with external castor bearing and therefore particularly suitable for use with rotors for long-stator linear motor systems.

The present disclosure provides rotors for a long-stator linear motor system, as is well known in the prior art. As described further below, the rotors according to embodiments of the disclosure can each have a secondary part for interaction with the linear motor strand(s) of the long-stator linear motor. For this purpose, the secondary part is equipped with at least one permanent magnet or non-switching electromagnet or at least one electromagnet, depending on the further development.

Furthermore, the rotor comprises at least two rollers for mounting the rotor on parallel guide rails of the long-stator linear motor system. It is irrelevant how the rollers or their running surfaces are designed in detail. The rollers can be designed with a flat running surface or may be ball-shaped. A concave roll-off profile of the rollers is also possible. The design of the running surface of the rollers can be selected depending on the design of the guide rails. An advantageous design is obtained if the surface of the guide rails has a curved profile which corresponds conclusively to a concave roll-off profile of the rollers. In this way, the rollers can be guided safely along the guide rail on the one hand. On the other hand, due to the positive fit between the roll-off profile and the rail profile, a torque acts on the rollers during cornering, which is transmitted to the angular position of the rotatable bolster, so that the parallel components of the rotation axes, i.e. the projection axes, are always aligned with the center of the respective curve.

As mentioned above, the rotor can have guide rollers in addition to the gravity-absorbing carrier rollers. The present disclosure provides automatic steering of the carrier rollers in embodiments, as well as of the track rollers in general, which significantly reduces wear due to abrasion. According to a further development of the first alternative embodiment of the disclosure, two matching rollers, one mounted on a first guide rail and the other on a second guide rail, wherein the first and second guide rails span the plane of movement, can be combined to a pair of rollers, which are mounted together with their roller axles on a rotatable bolster. Rotatable bolsters are sufficiently well known in the area of pivot axis steering and are therefore not described in detail here. The only decisive factor is that the individual rollers mentioned above or the two rollers of a roller pair, i.e. their rotational axes, are pivoted by a rotation of the rotatable bolster. In particular, if the projection axes of the two rollers of a pair of rollers coincide, an alignment of the rotatable bolster in the direction of the curve radius automatically causes the projection axes of both rollers to point towards the center of the curve and thus to fulfil the Ackermann principle.

According to a further development of this alternative embodiment, the rotor may furthermore have at least one guide element which can be displaced in a direction perpendicular to the direction of travel or pivoted in the guide plane and which is designed in engagement with the long-stator linear motor system, in particular with a guide rail or a control cam, to maintain a constant distance from the guide rail or the control cam, wherein the at least one rotatable bolster is connected to the guide element such that a displacement of the guide element perpendicular to the direction of travel or a pivoting of the guide element in the guide plane causes a change in the rotary position of the rotatable bolster. A separate guide element, in particular a separate pivotable guide element, can be provided for each rotatable bolster, or, as described more precisely below, a common guide element can be provided for two rotatable bolsters spaced apart from one another along the direction of travel.

Depending on the design of the roll-off profile of the rollers and the guide rails, it may be advantageous to actively influence the rotary position of the rotatable bolster or rotatable bolsters. According to the present development, this is achieved by providing a displaceable or pivotable guide element which, in mechanical or magnetic engagement with the long-stator linear motor system, maintains a constant distance from the guide rail. For example, the guide element can be designed as a guide roller that rolls on a guide rail or a control cam. A sliding shoe sliding on a guide rail or a control cam is also conceivable. A guide pin which is guided along the guide rail or a recess formed along the transport path, for example a control cam, can also be used as a guide element. Finally, a permanent magnet is also conceivable as a guide element which, due to the magnetic interaction with the guide rail, maintains a fixed distance to the guide rail within certain tolerances.

The guide element can be designed to be displaceable perpendicular to the direction of travel and can be arranged in particular centrally with respect to a longitudinal expansion of the rotor. At the transition from straight ahead to cornering, the finite longitudinal expansion of the rotor then results in a vertical displacement of the guide element, which, since the guide element is connected to the rotatable bolster, is also transferred to the rotary position of the rotatable bolster. In this way, without an active drive, simply by engaging the guide element with the long-stator linear motor system, the rotary position of the rotatable bolster is automatically adapted to the curve radius of the curve being traversed. It does not matter whether the guide element is guided on the curve-inner guide rail, on the curve-outer guide rail or on a guide band provided inside or outside of the guide rails or a guide channel or a control cam. Only the consistency of the distance of the guide element from any desired guide rail is significant.

Alternatively, the guide element can be configured to be pivotable in the guide plane. For example, the guide element can be designed as an eccentrically mounted roller that is in engagement with a guide rail. With appropriate preload, for example with a coil spring, the roller can always be aligned to be in contact with the guide rail. During transition to cornering or when the curve radius is changed, the rotary position of the guide element changes automatically, and the change can be transferred directly or via a displaceable element to the rotatable bolster.

Another alternative is to use one or more guide rollers mounted directly on the rotatable bolster as pivotable guide elements. For this purpose, the guide rollers are arranged in the direction of travel or in the opposite direction to the direction of travel, offset from the axis of rotation of the rotatable bolster. This offset causes the rotary position of the rotatable bolster to change automatically during the transition to cornering or when the radius of the curve is changed. This development is particularly advantageous if the track rollers to be steered are arranged centered relative to the rotational axis of the rotatable bolster with regard to the direction of travel.

A large number of alternative developments are conceivable in which maintaining a constant distance between the guide element and a guide rail or a control cam causes a change in the rotary position of the rotatable bolster or rotatable bolsters of the rotor when the curve radius changes.

According to a special development, the at least one rotatable bolster can be connected to the guide element via at least one connecting element, wherein the connecting element is designed in such a way that a displacement of the guide element during cornering towards the outside of the curve causes an alignment of the rotatable bolster in the direction of the curve radius. According to this development, the guide element thus exerts a force on the at least one connecting element in the event of a displacement perpendicular to the direction of travel or perpendicular to a longitudinal axis of the rotor, which force is transmitted by the connecting element to the rotatable bolster in such a way that a torque is produced which aligns the rotatable bolster in the direction of the radius of the curve. More precisely, as described above, the projection axes of the rollers mounted on the rotatable bolster are aligned towards the center of the curve. A large number of connecting elements of a rigid, flexible or elastic type are here conceivable.

For example, the at least one connecting element may comprise an elastic rail or rod connecting two rotatable bolsters to each other, which is engaged with or connected to the guide element in such a way that displacement of the guide element causes elastic deformation of the rail or rod. The connection of the rotatable bolster with the guide element does not have to be force-locked or fixed according to the special development described above, but can also be made by positive locking or by mechanical contact without mechanical connection. According to the present example, two rotatable bolsters may be connected to each other via an elastic rail or rod which acts on the rotatable bolster in such a way that the deformation force acting on the rail or rod by the displacement of the guide element exerts a torque on the rotatable bolsters which in turn aligns the rotatable bolsters in the direction of the curve radius as described above. The guide element can be fixedly connected to the elastic rail or rod or simply brought into mechanical contact with the elastic rail or rod. The elastic rail or rod can, for example, be manufactured from an elastic plastic using the 3D printing process.

According to an alternative development, the connecting element may comprise a rigid slide interconnecting two rotatable bolsters in each case in a positive manner, in particular by means of a groove, which is in engagement with or is connected to the guide element in such a way that a displacement of the guide element causes a displacement of the slide perpendicular to the direction of travel. The rigid slide can in particular be fastened centrally and displaceably to the rotor, the guide element, for example a guide roller or control roller, being mounted on the slide itself. The two rotatable bolsters are positively connected to the rigid slide, for example by providing lateral arms of the slide which engage positively in a groove of the respective rotatable bolster. Thus, the rotatable bolsters can rotate relative to the rigid slide, whereby a connection via a pivot joint is also conceivable. As with the elastic rail or rod mentioned above, the rigid slide thereby acts as a transmission element which converts a translational movement of the guide element into a torque and thus a rotational movement of the rotatable bolster or rotatable bolsters.

A transmission can also be provided between the rigid slide and the rotatable bolsters. If the correct transmission ratio is selected, the rollers mounted on the rotatable bolsters can roll on the guide rails without tracking errors. This is also possible in a transition area from a straight piece to a curved piece, for example in the form of a clothoid. The smaller the radius of the guide rail to which the guide element maintains a constant distance, the more the slide is displaced perpendicular to the rotor and the more the rotatable bolsters are deflected. If the correct transmission ratio is selected, the rollers can have the correct alignment at any point of the clothoid, i.e. towards the center of the curve. As mentioned above, the distance, for example when the guide element slides or rolls on a guide rail, can be in particular zero.

For example, the alignment of the rotatable bolster by shifting the slide can be influenced by selecting a relative position of the positive connection between the rotatable bolster and a center of the slide so that a virtual axis connecting the rollers of a pair of rollers is aligned in the direction of the curve radius of a curve with a given curvature. In other words, the positive connection between rotatable bolster and slide, for example by a correspondingly long design of the corresponding arm of the slide, is arranged between the rotatable bolster and the slide in such a way that the vertical displacement of the slide caused by the curve radius with a given curvature causes the desired change in the rotary position of the rotatable bolster. The closer the positive connection is to the rotatable bolster, the greater the influence on the rotary position of the rotatable bolster. The virtual axis connecting the rollers of the pair of rollers mentioned here corresponds to the aforementioned alignment of the projection axes of the rollers.

By designing the rotors with steerable rotatable bolsters, roller wear can be considerably reduced. By providing a guide element, the track rollers can be correctly guided at any time, even with a flat or convex roll-off profile. Neither an external energy source nor a control device is required for this purpose. The described developments thus allow a simple and maintenance-free steering of track rollers without tracking errors.

According to embodiments of the present disclosure, regardless of whether or not rotatable bolsters and/or steering rotational axes with integrated castor are provided, the rollers, i.e. the track rollers, of the rotor can be designed with a concave roll-off profile which is designed in such a way that the rollers roll in a laterally stable manner on a surface of the guide rails. The concave roll-off profile can, for example, be adapted to a convex surface profile of the guide rails. In this case, the laterally stable guidance of the track rollers on the guide rails ensures that the steered rollers are automatically aligned in the direction of travel by adjusting the rotary position of the rotatable bolster and/or due to the castor.

As mentioned above, the technical object is achieved alternatively or additionally by providing at least one roller with a roller axle with integrated castor. The at least one roller steered in this way is in particular a track roller, i.e. the roller axle of the at least one roller is arranged parallel or obliquely to the plane of movement of the rotor. Since no part of gravity is applied to pure guide rollers, it is generally not necessary to design guide rollers with integrated castor. However, a roller whose roller axle has at least one component parallel to the plane of movement carries at least part of the weight force of the rotor. As a result of the castor, a torque is generated on the bearing of the roller, which automatically aligns the roller in the direction of travel.

As already mentioned, the integrated castor is achieved according to this development by supporting the roller by means of a bolt via an asymmetrical and/or oblique bore on a roller axle and providing a pendulum ring with an external ball or slide bearing mounted on the bolt. The eccentric and/or inclined bore through the roller axle, whether rigid or mounted on a rotatable bolster as described above, together with the eccentric and/or inclined support of the pendulum ring on the bolt through the bore, creates an integrated castor of the steering rotational axis so that the roller is individually steerable. The torque resulting from the castor during cornering automatically aligns the roller in the direction of travel, even if the roller is not designed with a side-stable roll-off profile. In this way, the grinding of the roller in the curve area can be avoided, which increases the service life of the roller. The integrated castor design is much more compact than the design with an outer steering rotational axis, whereby the rollers designed in this way can be used in an improved way for rotors for long-stator linear motor systems. In addition, the integrated castor limits the maximum steering angle via the pendulum ring, so that transverse turning or turning over into another direction as known from external steering rotational axes of shopping carts are avoided.

As mentioned above, the at least one roller can also comprise an outer ring mounted on the ball or slide bearing. The outer ring thus slides or rolls on the ball or slide bearing so that the rotation axis of the roller, which is given by the rotation of the outer ring, can deviate from the roller axle. The axis of rotation is determined by the position of the pendulum ring.

According to a further development, the bolt can be non-rotatably connected to the roller axle, with the pendulum ring being rotatably mounted on the bolt. In other words, the position of the bolt relative to the roller axle is fixed, while the pendulum ring can oscillate around the bolt.

Alternatively, the pendulum ring can be non-rotatably connected to the bolt, while the bolt is rotatably mounted on the roller axle. In other words, in this case the position of the pendulum ring relative to the bolt is fixed, while the bolt in the bore is rotatable through the roller axle.

To allow the pendulum ring to pivot around the steering rotational axis, an inner diameter of the pendulum ring may be larger than a diameter of the roller axle to form an annular gap between the roller axle and the pendulum ring. The inner diameter of the pendulum ring is larger than the diameter of the roller axle by an amount dependent on the maximum angular adjustability, so that the pendulum ring can oscillate around the roller axle within the desired angular range. Alternatively or additionally, the pendulum ring can have recesses on the inside which allow it to oscillate around the roller axle. The recesses can be provided on the inside of the pendulum ring in the direction of travel and against the direction of travel. In this case, the pendulum ring can be arranged away from these recesses at a minimum distance from the roller axle. Once again, the recesses can be dimensioned in such a way that the pendulum ring can be pivoted through a desired angular range. As mentioned above, the stop of the pendulum ring on the roller axle prevents the roller from turning transversely or from turning over. The angle range, i.e. the distance of the pendulum ring from the roller axle and/or the dimensioning of the recesses, can be selected according to the curve radii to be traversed.

For example, the pendulum ring can be spaced from the roller axle by means of one or more spacer elements, by forming the bolt as a stepped bolt and/or by press fitting or gluing to the bolt. A stepped bolt, as is known, has different sections, whereby the diameter of a section for receiving the bolt in the pendulum ring can be smaller or of a different cross-section.

If the rotor moves on a straight piece of the transport path or guide rail, the track rollers in their basic position follow the direction of travel exactly. If the rotor now moves from the straight line into a curved piece, the track rollers follow the transport path or guide rail geometrically correctly due to the restoring torque. In the same way, the rollers align themselves straight again when the rotor moves from cornering to a straight section again.

The design of individual or all track rollers of the rotor with steering rotational axes with integrated castor can be effectively combined with the rotatable bolster steering described above. If, for example, a residual tracking error of the rollers concerned occurs due to insufficient deformation of the elastic connecting element or insufficient displacement of the rigid slide, the integrated castor of these rollers can result in correct alignment of the rollers. In the combined design, it is sufficient to form the integrated castor with a small angular range of the pendulum movement. Conversely, the combined design makes it possible to use the rotor according to the invention on curved pieces with strongly varying curve radii.

The present disclosure also provides a long-stator linear motor system with a plurality of rotors according to one of the developments described above, which further comprises a transport path with at least two parallel guide rails on which the rotors are movably mounted, wherein a respective roller of a pair of rollers of the rotors is each mounted on one of the two guide rails and the other roller of the pair of rollers is each mounted on the other of the two guide rails, and wherein the transport path comprises at least one straight piece and at least one curved piece and/or curved pieces with different curve radii. According to this development, the transport path is thus designed as a double rail system, wherein additional guide rails may be provided for further stabilization of the rotors and/or for the guide elements described above. The double rails guided in parallel span the plane of movement described above, since the curves described by the guide rails lie in this plane.

The rotatable bolsters of the rotors as described above thus connect two rollers, one of which is mounted on each of the two guide rails. Changing the rotary position of the rotatable bolsters thus aligns the projection axes of these rollers towards the center of the curve.

Long-stator linear motor systems are well known in the prior art, so that a detailed description is not given here. It should only be mentioned that the long-stator linear motor systems can be equipped with one or two linear motor strands along the transport path. The linear motor strands can be designed as long stators of linear motors, especially synchronous ones. In an alternative design, the linear motor strands can also be designed as asynchronous linear motors, wherein the at least one permanent magnet and/or non-switching electromagnet of the secondary part of the rotors and/or an electrically conductive element of the rotors, for example in the form of a metallic plate to which the permanent magnet and/or non-switching electromagnet are attached, act as conductors for induction by the asynchronous linear motors.

Due to the magnetic interaction between the magnets of the secondary parts and the long stators, the rotors can be moved with an individual displacement-time profile along the transport path, i.e. along the guide rails. The control of the rotors can be achieved by selectively controlling the magnets of the rotors and/or the linear motors by means of a suitable control device.

If the rotors are designed as passive rotors, i.e. with a secondary part with one or more permanent magnets or non-switching electromagnets, the rotors are moved by interaction with the electromagnetic alternating fields generated by individual controllable electromagnets of the linear motor strands. Alternatively, the rotors can be equipped as active rotors with electrical windings which can apply the alternating magnetic fields required for the drive. Accordingly, a section of the transport path is equipped with permanent magnets or non-switching electromagnets. Both the electrical energy required for the drive and the signals required for the control can be transmitted to the individual rotors via induction transmission.

The rotors can be designed in particular as transport elements for transporting piece goods, for example containers. As shown in FIG. 1, the rotors can be equipped with a suitable holding device, for example in the form of a gripping element. The gripping element can be either passively or actively controllable. In particular, gripping elements are conceivable for positively or non-positively gripping a neck area of containers, for example in the so-called neck handling of plastic bottles, wherein the held container can be rotatably mounted in the gripping element during positive gripping around its longitudinal axis. In addition, the gripping element can be made pivotable and/or height-adjustable and can be arranged above, below or next to the rotor.

Containers are in particular beverage bottles, but also other containers for foodstuff, drugs, hygiene articles, cleaning agents or the like, such as cans, glass bottles or other glass containers with lids, packaging based on cardboard or composite materials, Tetrapak, or the like. In the case of plastic containers, intermediate products, in particular preforms for stretch blow molding the containers, are also included. In addition, containers in the sense of the present disclosure are also to be understood as packs composed of several containers. The long-stator linear motor systems with rotors according to the present invention can thus be used in particular in container treatment plants.

As already mentioned, the rotors each have at least one secondary part for magnetic interaction with the at least one long stator. For this purpose, at least one sequence, i.e. sequence in the longitudinal direction of the rotor, of generally adjacent permanent magnets and/or electromagnets, in particular non-switching electromagnets, of alternating polarity may be attached to the secondary part, which may, for example, be in the form of a carrier plate. Depending on the design and arrangement of these magnets, and depending on whether a one-sided or a two-sided linear motor drive is used, the rotors may also have two or more secondary parts. For example, a separate secondary part can be provided for each long stator. In this case, the arrangements of the sequences of magnets on the secondary parts may be the same or different, in particular mirrored. To simplify the representation, rotors with exactly one secondary part are assumed here and in the following without restriction. In a particular case, the sequence may have only one single magnet of a certain polarity.

The at least one long stator of the long-stator linear motor systems described here can be formed in a particularly simple version by a large number of electrical windings arranged along the linear motor strand in the form of electromagnets which can be controlled individually or in blocks. More complex designs are also conceivable, for example by means of a Halbach arrangement of the electromagnets, to amplify the magnetic flux on the side facing the secondary part.

The magnets of the at least one sequence can be arranged transverse to the transport path on the secondary part of the rotor, so that one of the magnetic poles of each magnet can interact with a first long stator, while the other magnetic pole can interact with a second long stator. Alternatively, the sides of the secondary part facing the first long stator and the second long stator may also have separate sequences of magnets, which may be formed in particular in a Halbach arrangement for amplifying the magnetic flux in the direction of the respective linear motor strand. Furthermore, a version with only one long stator is also conceivable, whereby the magnets of the secondary can be arranged in a Halbach arrangement in particular. The supply of at least one non-switching electromagnet of the secondary part of the rotor with the required electrical energy can be achieved via an electrical line or power supply rail arranged along the transport path and via electrical contacts of the rotor, for example via power collector shoes. Alternatively, transmission of the required electrical energy via induction is conceivable.

In linear motors, the magnets of the rotors and the long stator(s) are generally aligned and dimensioned so that they face each other on both sides of an air gap, with the largest possible overlap of the opposing magnetic poles being aimed at in the direction perpendicular to the direction of transport or movement and along the air gap in order to achieve optimum propulsive force. Two basic configurations are conceivable for the orientation and relative arrangement of guide rail(s), long stator(s) and secondary part.

In a first design, guide rail(s), long stator(s) and secondary part are arranged such that the air gap between the poles of the magnets of the secondary part and the long stator is aligned to be substantially perpendicular to a contact surface of the long-stator linear motor system. In this "vertical" case, the generally elongated poles of the magnets of long stator and secondary part are also aligned to be substantially perpendicular. The same applies to a carrier plate of the secondary part. The direction of movement and the course of the at least one guide rail are here assumed to be substantially horizontal, i.e. parallel to the contact surface. Thus, the plane of movement spanned by the guide rails is also horizontal. Moreover, in the case of a linear motor on both sides, the two long stators run parallel to each other in a horizontal plane.

In a second, alternative design, the guide rail(s), long stator(s) and secondary parts are arranged in such a way that the air gap between the poles of the magnets of the secondary part and the long stator is aligned substantially parallel to the contact surface of the long-stator linear motor system. In this "horizontal" case, the generally elongated poles of the magnets of long stator and secondary part are also aligned to be substantially horizontal. The same applies to a carrier plate of the secondary part. The direction of movement and the course of the at least one guide rail are also assumed to be substantially horizontal, i.e. parallel to the contact surface. In the case of a linear motor on both sides, however, the two long stators now run parallel to each other in a vertical plane.

In both versions, the movement of the rotors takes place in a horizontal plane, the movement plane or guide plane. It goes without saying, however, that the above mentioned transport path can also include inclines, even vertical sections. Accordingly, the relative arrangements of guide rails, long stators and secondary parts must be adapted to the alignment of the transport path. For the sake of simplicity, a horizontally aligned transport path is assumed here and in the following without restriction. It is understood, however, that the terms "perpendicular", "vertical", "parallel" and "horizontal" used below do not define an absolute reference system, but are to be understood in relation to the alignment of the transport path unless explicitly stated otherwise.

In the prior art, the greatest possible overlap of the opposing poles is usually provided perpendicular to the direction of travel, i.e. parallel to the area expansion of the air gap and perpendicular to the direction of travel, in order to maximize the magnetic interaction.

In particular in the horizontal version with horizontal air gap described above, the rollers carry the weight force of the rotor and, in the case of a one-sided long stator arranged on the underside, the normal force exerted by the long stator on the secondary part. In the vertical version with vertical air gap, only the weight force of the rotor acts on the carrier rollers. As already mentioned several times, these experience mechanical wear.

The present disclosure also provides rotors that are optimized with regard to mechanical wear. In particular, the rotors can be designed with secondary parts that comprise asymmetrically arranged magnets with respect to a median plane of the long stator(s), or more precisely the magnets or iron cores of the electromagnets of the long stators. In particular, the magnets of the secondary parts can be arranged in such a way that their expansion below the median plane is greater than their expansion above the median plane. The median plane of the long stators is defined by half the height of the magnets or iron cores of the electromagnets of the long stators.

By equipping the secondary parts of the rotors according to embodiments of the disclosure with magnets, the larger part of which is arranged below the median plane, a force directed obliquely upwards acts on these magnets due to the interaction with the magnets of the long stators, which counteracts the weight force of the rotors. On the carrier rollers or, in general, on bearing elements such as slide bearings, the rotor thus exerts a weight force reduced by the vertical component of the magnetic interaction force. Due to the reduced weight force, the wear of the bearing elements, in particular the carrier rollers, is reduced at the same time.

According to a further development, the magnets of the secondary parts of the rotors can be designed in the vertical direction, i.e. perpendicular to the direction of travel and parallel to the air gap, with an expansion, i.e. height, which is greater than or equal to the expansion of the magnets or iron cores of the electromagnets of the long stator(s) in the vertical direction. The asymmetrical arrangement of the magnets of the secondary parts with a center of gravity below the median plane of the long stators then leads to a magnetic interaction force as described above which is directed obliquely upwards.

While with magnets of the same size of the secondary parts and the long stators in the vertical direction a shift of the magnets of the secondary parts downwards has the effect that the propulsive force is also reduced due to the reduced overlap with the magnets of the long stators, when using "oversized" magnets of the secondary parts, i.e. magnets whose vertical expansion is greater than the vertical expansion of the magnets or iron cores of the long stators, the desired inclination of the magnetic interaction force and thus reduction of the acting weight force can be achieved without reduction of the propulsive force.

The magnets of the secondary parts or the secondary parts themselves can be firmly connected to the rotors. Alternatively, the magnets or the secondary parts can be connected to the rotors via a spring-elastic element, whereby an additional holding device, e.g. a gripping element for containers, of the rotors is attached to the spring-elastic element together with the magnets or the secondary parts. A change in the load capacity of the rotor, for example when filling the carried container, automatically affects the vertical positioning of the magnets of the secondary part relative to the magnets of the long stator via an increase in the expansion of the spring-elastic element. In other words, an increase in the load capacity shifts the magnets of the secondary part downwards. This is counteracted by the vertical component of the magnetic interaction force described above, i.e. all the more the further the magnets of the secondary part are shifted downwards (as long as there is a sufficient overlap). When a spring-elastic element is used to fasten the secondary part and the holding device to the rotor, the reduction in weight force described above thus increases with the increase in load capacity, which counteracts the weight force which is increased due to the increased load capacity. In order to avoid vibrations, the spring-elastic element can be damped.

The described developments with asymmetrically designed and/or arranged magnets of the secondary parts reduce the forces acting on the carrier rollers or bearing elements due to the weight of the rotor or the transported load and thus reduce the mechanical wear of the carrier rollers or bearing elements.

The described effect can also be used in the horizontal design with a horizontal air gap by partially compensating lateral forces preferably occurring in this design on one side, e.g. centrifugal forces, by asymmetrical arrangement of the magnets of the secondary parts in such a way that the greater part of the magnets is arranged on the opposite side to this side.

As already indicated several times, the asymmetrical arrangement of the magnets of the secondary parts can also be used for rotors that are not supported by rollers, but are supported on the guide rails by alternative bearing elements, in particular slide bearings.

Transport systems based on long-stator linear motor systems are well known in the prior art. In such transport systems, a large number of individually movable rotors are generally mounted at least partially mechanically on one or more guide rails. Due to frictional processes caused by the relative movement between rotors and guide rails, the frictional electricity can lead to a considerable electrostatic charge of the rotors, which can damage persons or components in the event of uncontrolled discharge. Methods are known for dissipating electrostatic charges from a moving rotor to stationary, grounded components via an electrical contact device. Various designs of sliding contacts are known as electrical contact devices. However, the discharge of electrostatic charges by mechanical contact with a discharge device is subject to wear and therefore leads to wear on the rotors and the contact device due to continuous operation of the long-stator linear motor system.

Thus, it is also an object of at least some embodiments of the present disclosure to enable neutralization of electrostatic charges on the rotors of a long-stator linear motor system with as little wear as possible. In general, the present disclosure is based on the object to extend the service life of the long-stator linear motor system and to reduce maintenance costs.

The above-mentioned object may be achieved in embodiments by a long-stator linear motor system with a transport path and a plurality of rotors which are movably mounted on the transport path, wherein at least one device for electrostatic charging and/or discharging of the rotors is provided on the transport path, and wherein the device is designed to charge and/or discharge the rotors contactlessly by means of a fluid.

As mentioned above, long-stator linear motor systems are well known in the prior art, so that a detailed description is not given here. A long-stator linear motor system always comprises a transport path, which can particularly include one or more guide rails, along which the multitude of rotors can be moved in an individually controlled manner. The individual movement of the rotors is effected by magnetic interaction of the secondary parts of the rotors with the long stator(s) of the long-stator linear motor system. In order to avoid repetitions, reference is only made here to the developments of the rotors described above, in particular the secondary parts with permanent magnets or non-switching electromagnets as passive rotors or with specifically controlled electromagnets as active rotors. Accordingly, as mentioned above, the long stators can be designed as synchronous or asynchronous linear motor strands.

As mentioned above, electrostatic charging of the rotors occurs due to the relative movement of rotors, which are mounted at least partially mechanically on the transport path, in particular on the guide rails, and of the transport path. However, the present invention can also be applied to fully magnetically supported or fully pneumatically supported rotors which are electrostatically charged in some other way. In particular, the developments described below can also be used for the targeted charging of uncharged rotors with a desired charge polarity. The developments described in the following are explicitly applicable in particular to the rotors described above, which are mounted on guide rails by means of track rollers and/or guide rollers. However, the present invention is not limited to the rotors described above, but is generally applicable to long-stator linear motor systems.

According to embodiments of the present disclosure, at least one device for electrostatic charging and/or discharging of the rotors is provided stationary on the transport path, the device being designed to charge and/or discharge the rotors contactlessly by means of a fluid. The device for electrostatically charging and/or discharging the rotors, hereinafter briefly referred to as the discharge device, is arranged on the transport path in such a way that passing rotors can be charged or discharged by means of charge exchange with a fluid. Accordingly, the discharge device is arranged in the region of the transport path at a distance and a position such that the fluid can be brought from the discharge device into contact with the surface of the rotors to be discharged or charged. Here and in the following, the term "contactless" in relation to charging and/or discharging is to be understood as meaning that no mechanical contact with a solid, such as a sliding contact, has to be produced for charging and/or discharging. Instead, the discharge device may be designed to deliver a flow of the fluid in the direction of the rotor to be discharged and/or charged. The discharge device may also be designed to charge the fluid electrically with a desired charge polarity before or during delivery.

To discharge an electrostatically charged rotor, the discharge device may be designed to electrically charge the delivered fluid with charges of the inverse polarity of the rotor charge. This can be predetermined by pre-selection, for example when the materials used for the bearing elements of the rotors and the transport path or guide rails cause electrostatic charging with a predetermined polarity.

Alternatively, a sensor may be provided on the transport path in the feed to the discharge device, which sensor is designed to determine the polarity of the electrostatic charge of the rotors guided past the sensor. The sensor can, for example, be designed as a potential sensor (EPS—electric potential sensor), in particular as a surface potential sensor, ion equilibrium sensing device or potential sensing device. The sensor can thus be used to determine the polarity of the electrostatic charge. In addition, the sensor can be designed to determine the amount of electrical charge on the surface of the rotor.

According to a further development, the sensor can be connected to a control device via a signal line or a transmitter, which control device is designed to regulate the polarity and/or the amount of charges generated per unit of time by the discharge device as a function of the signals transmitted by the sensor. For this purpose, the discharge device can be designed in such a way that it can charge the fluid either positively or negatively, for example by adjusting electric currents. Accordingly, positive or negative ions can be generated in the fluid, which are then released together with the fluid in the direction of the rotor. The rotor is discharged by contact of the positive or negative ions with the charged surface of the rotor. By means of the sensor and the control device, the flow of the positive or negative ions can be regulated, for example by adjusting the current intensity, in such a way that the charged surface of the rotor is substantially neutralized.

However, developments are also conceivable in which the surface of the rotor or part of it is charged by contact with the positive or negative ions in a targeted manner. The charges applied in a targeted manner can then be used to carry out special functions of the rotor. For this purpose, the rotors can have one or more capacitors which store the charges applied. The charge energy stored in this way can then be used, for example, to operate entrained sensors or actuators of the rotors. The applied charge can also be used to pick up objects of opposite charges by electrostatic attraction. In addition, the rotors can also be individually marked by applying charges in a targeted manner, for example for product tracking. The rotors charged in this way can be clearly identified by means of a further potential sensor located downstream of the discharge device. The long-stator linear motor system according to the invention can thus have a further potential sensor which is designed to determine the amount of the electrostatic charge of the rotors guided past the sensor. This potential sensor can also be connected to the control device, which then allows certain treatment steps to be carried out on an entrained product depending on the identified rotor.

In the basic form, embodiments of the present disclosure may include a discharge device designed to neutralize the charged surfaces of the passing rotors. The discharge of the rotors can take place especially upstream of a cleaning station arranged on the transport path for cleaning the rotors. Since dirt particles adhere less strongly to the surfaces of the rotors after neutralization, they are easier to clean.

A multitude of other embodiments is conceivable in connection with the long-stator linear motor system according to the invention. The developments of the discharge device described here also include devices which serve the specific purpose of charging the rotors with the desired charges.

According to a development, the fluid can be a gas which is partially ionized by means of the discharge device. The gas can in particular be air. The discharge device can be designed as an ionizer, for example as a high-voltage ionizer. The discharge device is designed to partially ionize the surrounding air. For this purpose, the ionizer can be equipped with conductive tip electrodes, for example in the form of a comb or sawtooth, on which atoms and molecules of the air are ionized by corona discharge and field emission. For example, the field emission can charge oxygen molecules positively or negatively so that corresponding oxygen ions are formed. The partially ionized gas can then be brought into contact with the surface of the rotor to be discharged.

For this purpose, the discharge device can also have a gas supply device by means of which the gas can be led past the electrodes of the ionizer to the surface of the rotor. For example, this gas supply device may be a blowpipe aligned in the direction of the passing rotors. Alternatively, the gas supply device may have a flow line with a valve connected to an air supply source, such as a compressed air source. By selectively opening and closing an adjustable valve, a quantity of gas ions per time unit can be brought in a targeted manner into contact with the surface to be discharged.

The gas supply device can be designed to conduct the ionized gas continuously or by gas impulse in a targeted manner in the direction of the rotor. In particular, the gas supply device in conjunction with the control device may be designed to deliver ionized gas only if a rotor is located in the area of the discharge device in order to avoid unwanted charging of the transport path.

The charging or discharging of the rotors by means of a high-voltage ionizer is contactless and wear-free. Compared to the discharge devices of the prior art based on mechanical contact, the discharge device according to the invention as described above is therefore more reliable and requires less maintenance. The method—in particular with air supply—works very effectively when charging or discharging fast moving objects such as the rotor. In addition, existing transport systems can be easily retrofitted by arranging the high-voltage ionizer described above on the transport path. A constructive change of the transport system, especially of the rotors, is therefore not necessary.

According to an alternative development, the fluid can be an electrically conductive liquid. It is preferable to use an electrically conductive fluid, such as an electrolyte, which is neither corrosive nor etching nor forms deposits. The discharge device may then be designed to direct a jet of electrically conductive liquid at the surface of the passing rotor to be discharged. Here, too, the discharge device can emit such a liquid jet in particular in pulsed form when a rotor is passing the discharge device. The long-stator linear motor system may also have a dripping liquid collecting device below the transport path, from which the liquid can be led back to the discharge device via a line.

For example, in order to direct the liquid jet at the passing rotors, the discharge device may have one or more fixed spray heads which spray the passing rotors continuously or in pulses with the electrically conductive liquid. The spray heads or generally a supply line for the electrically conductive liquid can be connected to a potential equalization, for example by being grounded. When the surface to be discharged comes into contact with the liquid jet, the excess charge is thus delivered to the spray head or to the supply line by electrical conduction in the liquid jet.

As with the use of a gas, the discharge of the rotor per liquid jet is contactless and wear-free. Compared to the contact-based method of the prior art, the described discharge device requires less maintenance and is therefore more cost-effective. As in the case of a discharge by gas, the liquid-based discharge device does not require any structural changes to the transport system or the rotor. Existing long-stator linear motor systems can therefore be easily retrofitted with the discharge device described above.

The above mentioned object may also be achieved by a method for contactless charging and/or discharging of rotors of a long-stator linear motor system with the following steps: feeding a rotor to be discharged and/or charged to a discharge station and contactless discharging and/or charging of the rotor by means of a fluid in the area of the discharge station. Again, the term "discharge station" is generally used for both a station for discharging and a station for charging the rotor. As described above, contactless discharge and/or charging by means of a fluid can be achieved by supplying an ionized gas, in particular ionized air, and/or by supplying an electrically conductive liquid by means of the discharge station. The method according to embodiments of the disclosure can therefore also include the controlled ionization of the gas, for example by means of an adjustable high-voltage ionizer. The method may also include the controlled continuous or pulsed supply of the ionized gas or electrically conductive liquid to the surface of the rotor to be discharged or charged.

This can be done as described above using a gas supply device such as a compressed air supply, a blowpipe and/or a valve. Accordingly, the electrically conductive liquid can be supplied by means of a spray head in the form of a liquid jet.

The method may also include detecting a polarity and/or an amount of electrostatic charge of a rotor in the inlet to the discharge station, for example by means of an electrical potential sensor. The measured polarity and/or the measured amount of electrostatic charge can be transmitted by means of a signal line or wirelessly to a control device which controls the discharge station accordingly to selectively deliver the amount of ionized gas required for neutralization.

As described above, the rotors can also be charged electrostatically in the discharge station in a targeted manner. For example, a charge applied to the rotors by means of the discharge station can be stored in an entrained capacitor of the rotors in order to operate entrained sensors or actuators at a later point in time. The method can thus also include targeted electrostatic charging of the rotors. By means of electrostatic attraction, oppositely charged objects can be picked up by the rotors after the rotors have been charged. Furthermore, the rotors can be marked by individual charging, for example for product tracking. For this purpose, as described above, the rotor passing by can be clearly identified downstream of the discharge station by means of a further potential sensor.

The method may also include automatic cleaning of the rotors in a cleaning station of the long-stator linear motor system after discharging the rotors in the discharge station. After neutralization of the electrostatic charges, the rotors are much easier to clean because dirt particles then adhere less strongly.

The same variations and developments previously described in connection with the long-stator linear motor system according to the invention can also be applied to the method according to the invention for contactless charging and/or discharging of the rotors.

The devices and methods described are both more reliable and require less maintenance than the prior-art contact-based discharge devices. In addition, existing long-stator linear motor systems can be easily retrofitted with the described devices without any design modifications.

Further features and exemplary embodiments as well as advantages of the present invention are explained in more detail below on the basis of the drawings. It goes without saying that the embodiments do not exhaust the scope of the present disclosure. It also goes without saying that some or all of the features described below can also be combined in other ways.

In the figures described below, identical reference signs designate identical elements. For better clarity, identical elements are described only at their first appearance. It goes without saying, however, that the variants and embodiments of an element described with reference to one of the figures can also be applied to the corresponding elements in the other figures.

Figure 4:
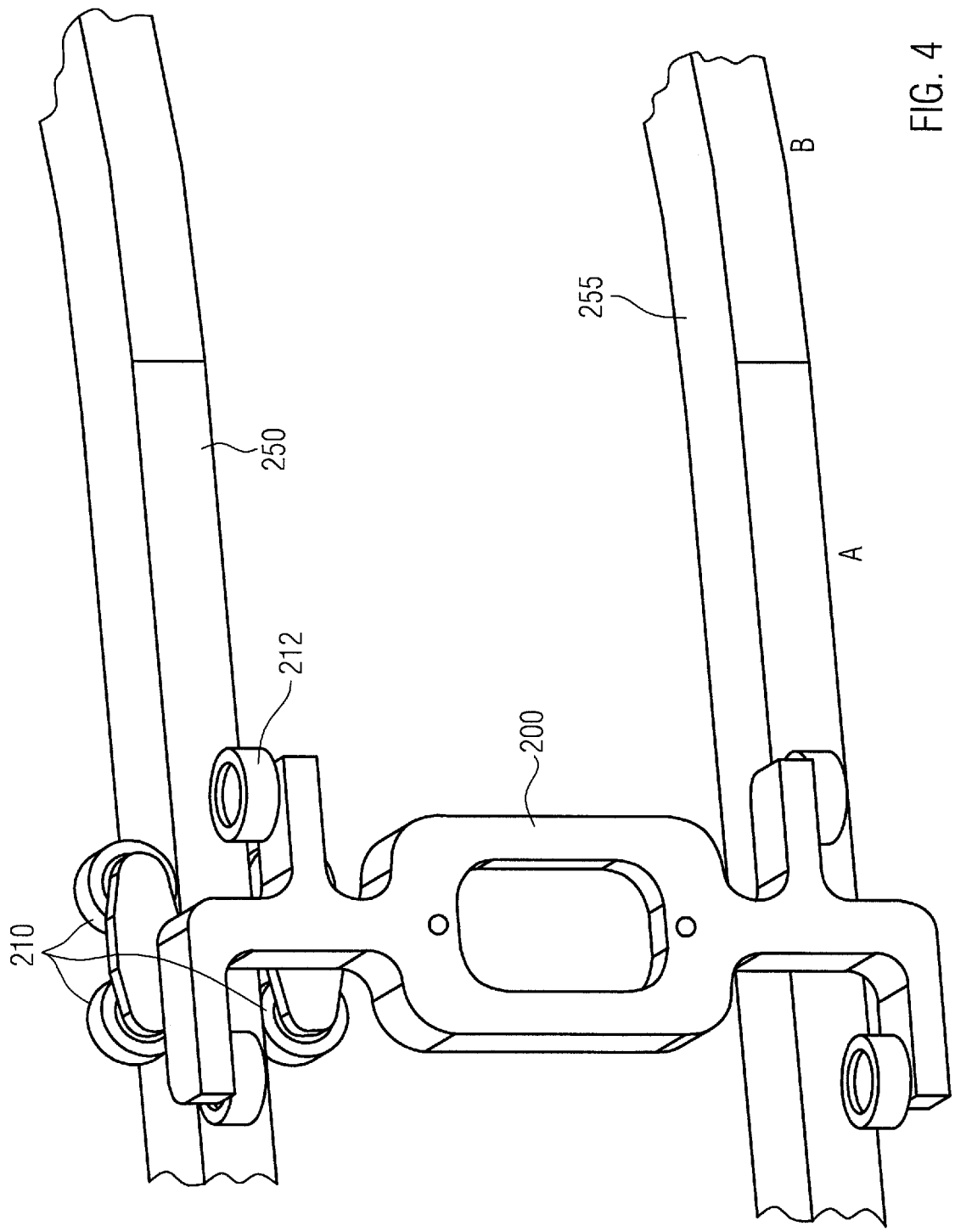
FIG. 4 shows an alternative configuration of a rotor and a transport path according to the prior art.
Figure 5:
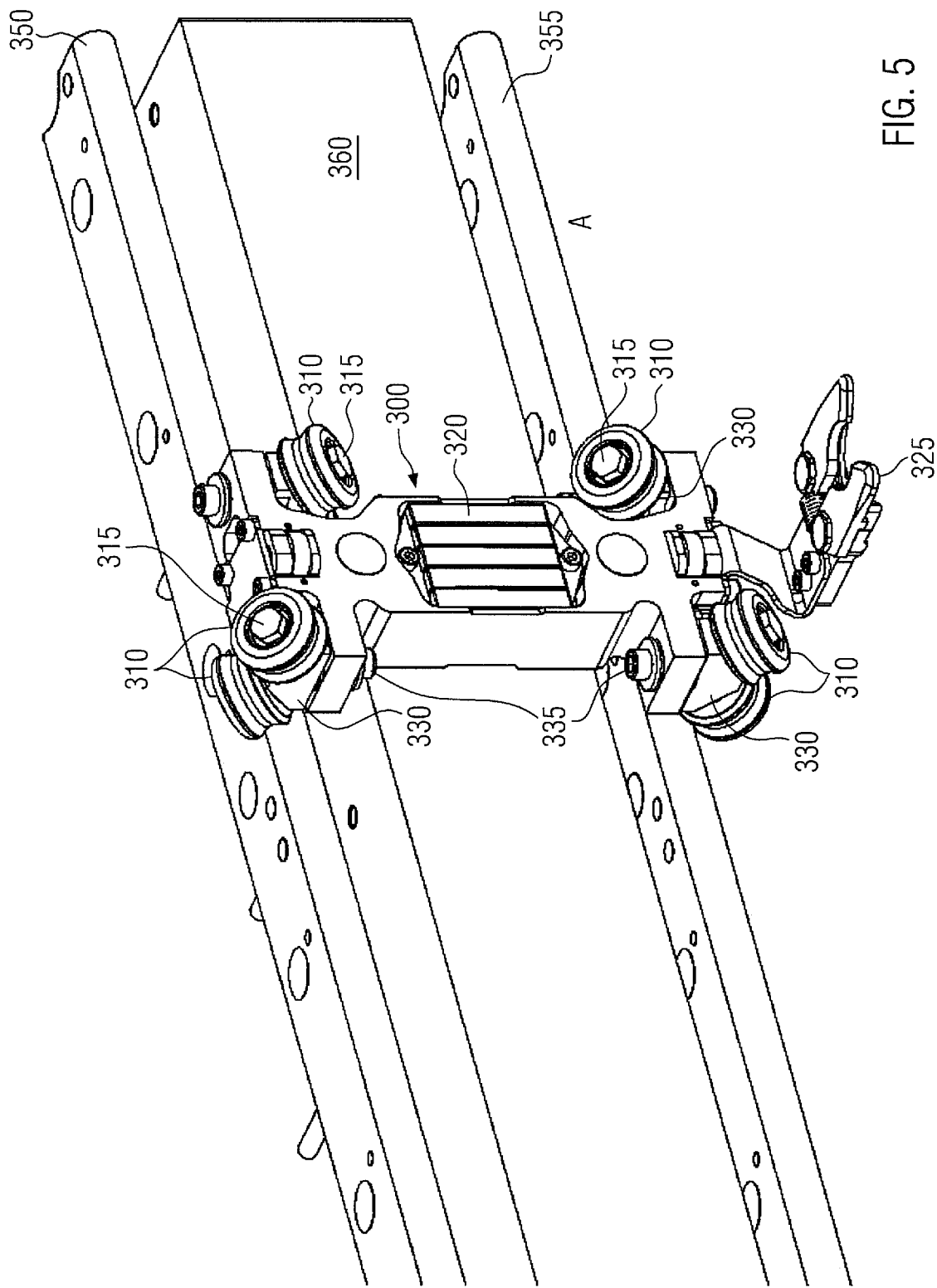
FIG. 5 shows an exemplary design of a rotor with rotatable bolster steering according to the present invention.

FIG. 5 schematically shows an example of a rotor with rotatable bolster steering according to an embodiment of the present disclosure. The rotor 300 shown here is individually movably mounted by means of a multitude of rollers 310 on upper guide rails 350 and lower guide rails 355. As already shown in FIG. 1, only the rear guide rails of the upper and lower guide rail pairs are shown for the sake of clarity. In fact, however, the rotor 300 moves between the upper and lower pairs of guide rails, wherein one roller 310 of a pair of rollers is respectively mounted on the rear guide rail and the other roller 310 of the pair of rollers is respectively mounted on the front guide rail (not shown). The design with double rails allows a particularly stable guidance of the rotor 300. However, further developments are also conceivable in which the rotors are only mounted on one side on vertically superimposed guide rails, as in FIG. 4. In this case, rollers are provided on the rotatable bolsters only on the side of the guide rails. However, the further developments of the rotatable bolsters and the guide element described in the following can also be applied to the one-sided linear motor guide.

Of the long-stator linear motor system, FIG. 5 only schematically shows one linear motor strand 360 in addition to the guide rails 350 and 355. To achieve better propulsion, however, as indicated by the arrangement of further magnets on the front of the secondary part 320, a further linear motor strand (not shown) may be provided parallel to the illustrated linear motor strand 360 along the front guide rails (not shown). FIG. 5 shows a straight section A of the transport path, i.e. guide rails 350 and 355 and linear motor strand 360. In the non-limiting further development shown in FIG. 5, the rotor 300 is designed with a holding device 325 in the form of a neck handling clamp, which can be used, for example, to transport plastic bottles.

The rotor 300 shown in FIG. 5 is also equipped with the rotatable bolster steering according to the invention. For this purpose, the rotor 300 has a total of four rotatable bolsters 330, which are attached to the rotor 300 by means of kingpins 335 so that they can rotate about an axis perpendicular to the plane of movement. The rotatable bolsters 330 each carry a pair of rollers 310 which engage on opposite guide rails and allow the rotation axes of the rollers 310 to be aligned as described above according to the radius of curvature of the respective path section.

In the non-limiting development shown here, the rollers 310 are rotatably mounted on the rotatable bolster 330 via rigid roller axles 315. The rollers are mounted on the rotatable bolsters 330 in such a way that the projection axes, i.e. the projections of the roller axles 315 onto the plane of movement, coincide.

Figure 6:
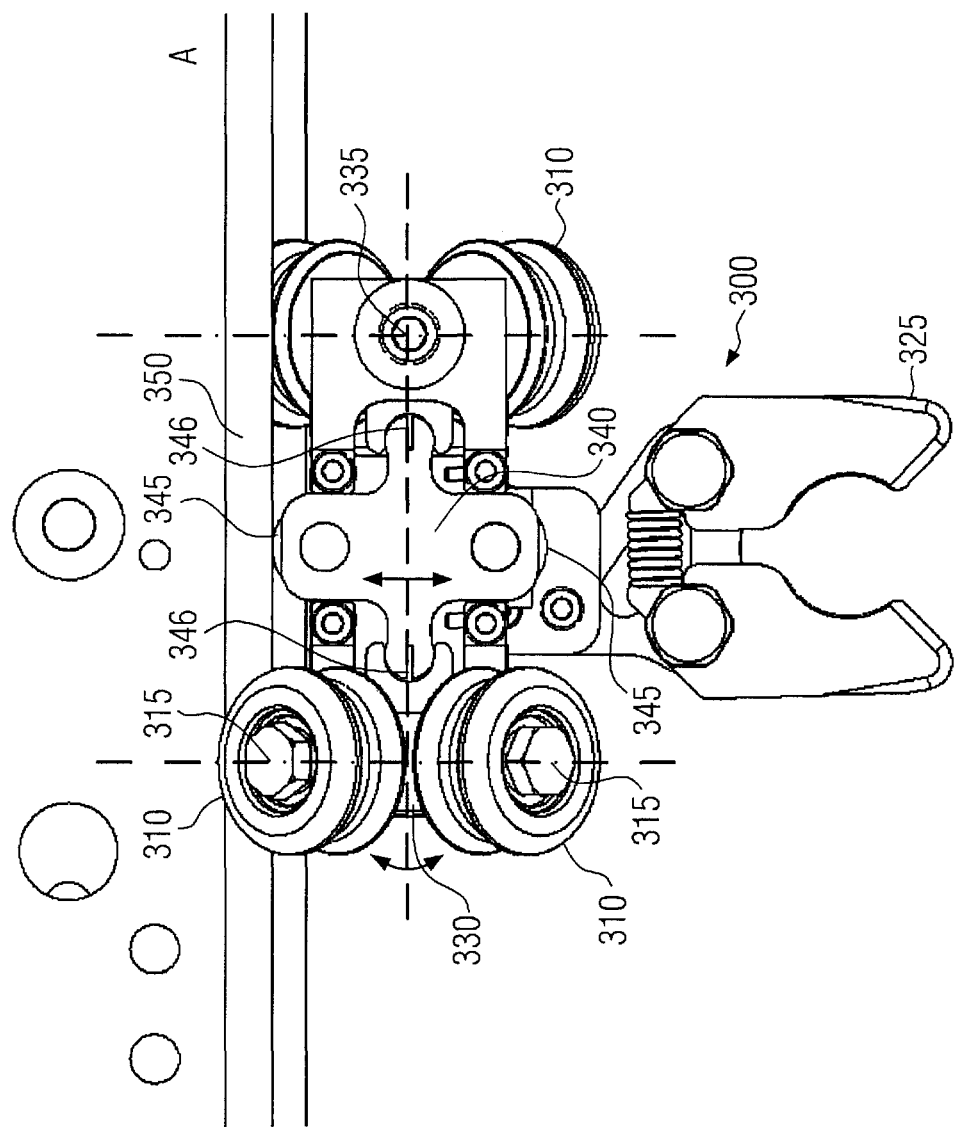
FIG. 6 shows the rotor of FIG. 5 in a vertical plan view of the plane of movement along a straight piece of the transport path.

The projection axes of the rollers are indicated by dotted lines in FIG. 6, which shows a vertical plan view of the plane of movement. Since the path section is a straight path section A, the projection axes are parallel to each other, which corresponds to a curve with an infinite radius of curvature. FIG. 6 also shows that the rollers 310 are mounted on the rotatable bolsters 330 via their rigid roller axles 315 in such a way that the projection axes coincide with a central axis of the rotatable bolsters 330. However, alternative developments that do not include this are also possible.

As indicated by the double arrow in FIG. 6, the rotatable bolsters 330 can be rotated about an axis perpendicular to the plane of movement. According to the further development shown here, the rotatable bolster is rotated by a guide element in the form of a guide roller 345 rolling along the guide rail 350. In the illustrated development the guide roller 345 is provided on both sides of a slide 340 which can be displaced perpendicular to a dashed longitudinal axis of the rotor 330, so that the slide 340 can be displaced perpendicular to the longitudinal axis of the rotor 300 via the engagement of the guide rollers 345 with the guide rails as indicated by the double arrow.

In the further development shown, the translatory movement of the slide 340 when entering a curved section is converted into a rotary movement of the rotatable bolster 330 via the engagement of lateral arms of the slide into the corresponding groove 346 of the rotatable bolster 330. Here the ratio of the length of the arms of the slide 340 to the distance of the groove 346 from the respective center axis or the bearing bolt 335 of the rotatable bolster 330 predetermines a transmission between the translatory movement of the slide 340 and the change of the rotary position of the rotatable bolster 330 due to the lever arm. As described above, the lever arm can be selected so that the projection axes of the rollers 310 during cornering are aligned towards the center of the curve as shown in FIG. 7.

Figure 7:
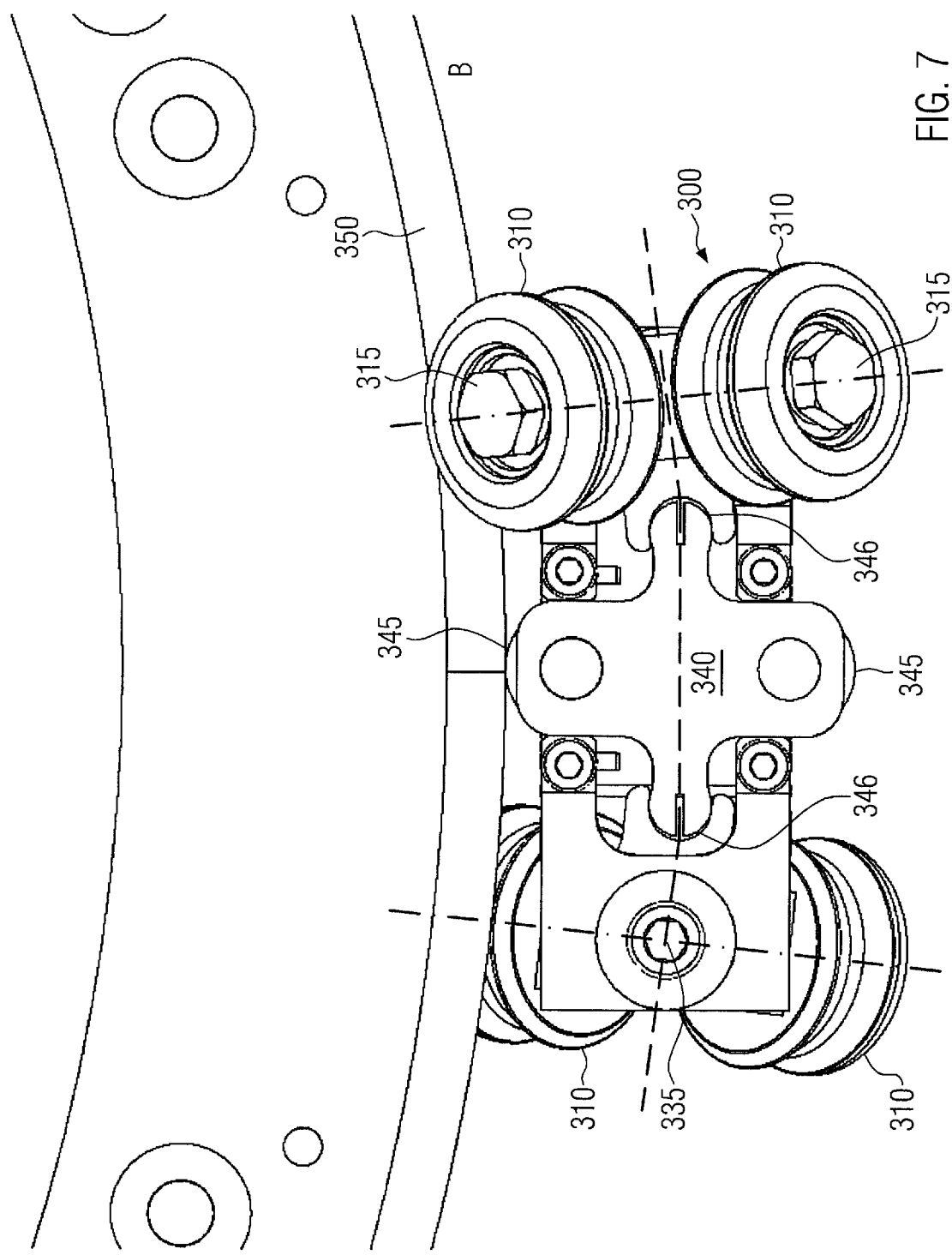
FIG. 7 shows the rotor of FIG. 5 in a vertical plan view of the plane of movement along a curved piece of the transport path.

FIG. 7 shows the rotor 300 along a curved section B of the transport path. Due to the curvature of the guide rail 350, the guide roller 345 following the guide rail is moved perpendicular to the longitudinal axis of the rotor 300, as indicated by the dashed line in the figure. This rotates the bearing of the slide 340 in the grooves 346 and thus changes the rotary position of the rotatable bolster 330, as indicated in the figure by the dashed lines.

Figure 3:
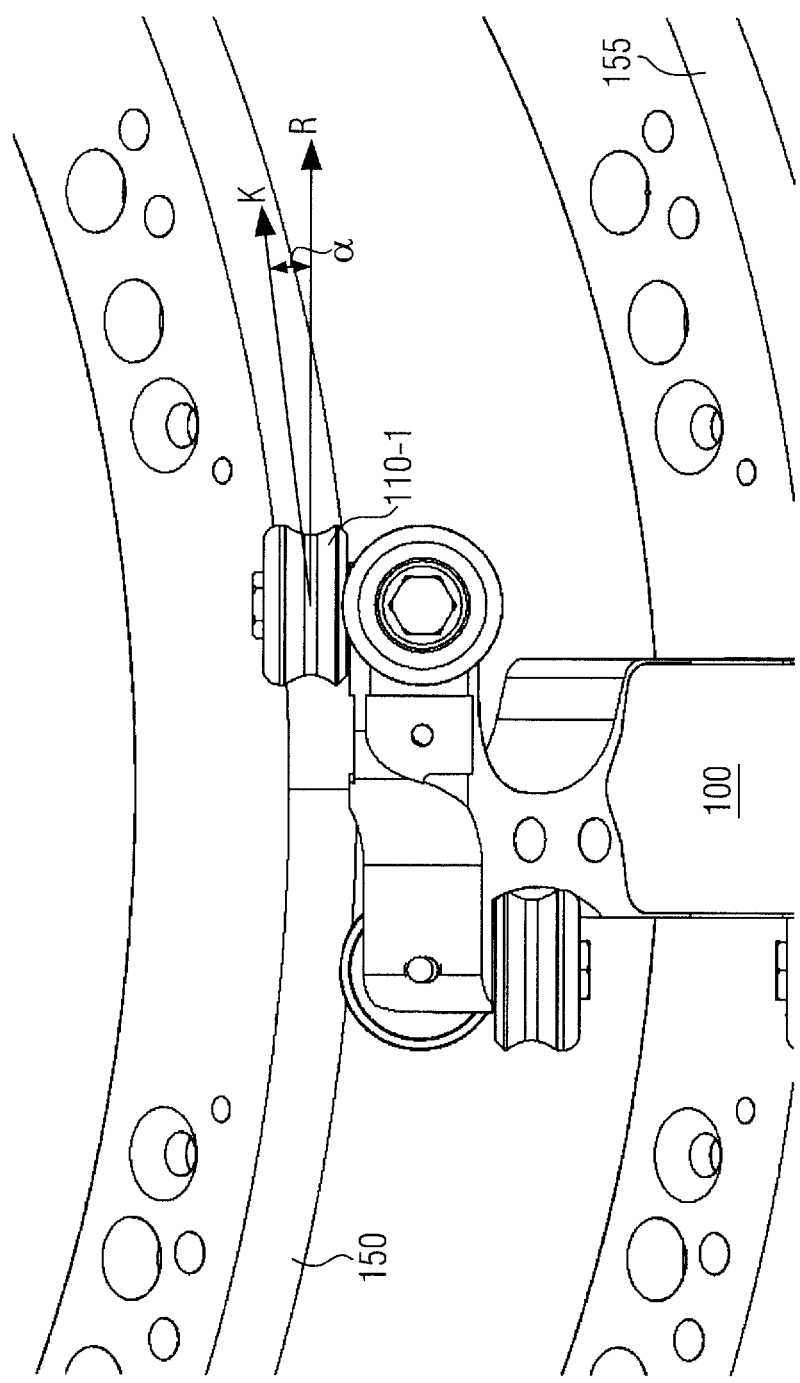
FIG. 3 exemplarily illustrates the tracking error of an unsteered roller during cornering.

Since the rollers 310 with their roller axles 315 are mounted on the rotatable bolsters 330 in such a way that the projection axes of the rollers of each pair of rollers coincide, the illustrated device automatically aligns all steered rollers in the direction of the curve radius. Thus, unlike the prior-art rotor shown in FIG. 3, the direction of travel K and the rolling direction R of the track rollers of the rotor 300 according to the invention always coincide. The controlled steering of the track rollers considerably reduces the wear of the track rollers caused by the tracking error.

Figure 8:
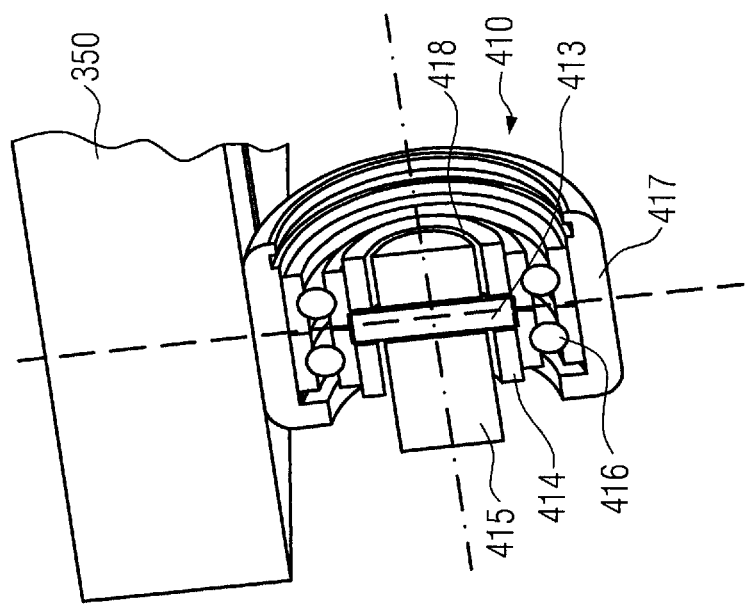
FIG. 8 shows a three-dimensional outline of an individually steerable roller with integrated castor according to the present invention.

FIG. 8 shows a three-dimensional view of an individually steerable roller with integrated castor according to the present invention. The track roller 410 shown in the figure has a flat rolling surface with which it rolls on the guide rail 350 or the transport path. The present disclosure can, however, also be applied to rollers with ball-shaped, i.e. convex, or concave roll-off profiles in embodiments.

Figure 9:
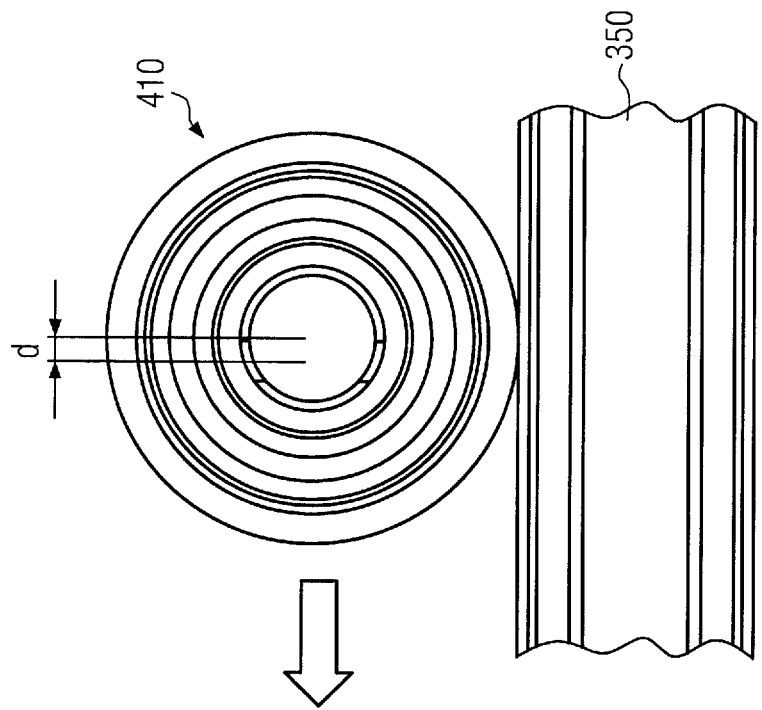
FIG. 9 illustrates the integrated castor of the roller shown in FIG. 8.

The track roller 410 shown in FIGS. 8 and 9 is equipped with an integrated castor. For this purpose the roller 410 comprises a pendulum ring 414, which is rotatably mounted on the rigid roller axle 415 via a pivot bolt 413. As shown in FIG. 9, the pivot bolt 413 is guided through an asymmetrical, i.e. eccentric, bore through the roller axle 415. Depending on the design, the pivot bolt 413 can be mounted in this bore either non-rotatably or rotatably. Accordingly, the pendulum ring 414 is rotatably or non-rotatably mounted on the pivot bolt 413.

To enable the pendulum ring 414 to be pivoted relative to the central axis of the roller axle 415, which is indicated by a dotted line, the pendulum ring 414 is spaced from the roller axle 415 via an annular gap 418. This can be done, as described above, for example, by press fitting, gluing or providing a stepped bolt, or by spacer elements. Due to the annular gap 418, the pendulum ring 414 can be pivoted within a desired angular range around the alignment of the roller axle 415. Since the pendulum ring is mounted asymmetrically to the central axis of the roller axle 415 via the pivot bolt 413, the roller 410 has a positive, integrated castor d, as shown in FIG. 9. The castor causes a return torque to act on the roller 410, which automatically aligns the pendulum ring 414 and thus the axis of rotation of the roller in the direction of travel, when the radius of curvature of the transport path changes.

According to the further development shown, the pendulum ring 414 is equipped with an external ball or slide bearing 416 on which the outer ring 417, which forms the rolling surface of the roller 410, rolls or slides. The position of the pendulum ring 414 thus defines the current axis of rotation of the roller 410. The pivot bolt 413 thereby defines the steering rotational axis indicated by a dashed line in FIG. 8, around which the roller 410 can be steered individually. The roller 410 which is designed with the steering rotational axis with integrated castor has an extremely compact design and can therefore be used in many different ways in long-stator linear motor systems. In particular, the individual wheel steering of the present development can be combined with the rotatable bolster steering described above. The single-wheel steering can compensate for remaining track faults of the track rollers, so that wear on the track rollers can be minimized.

Figure 10:
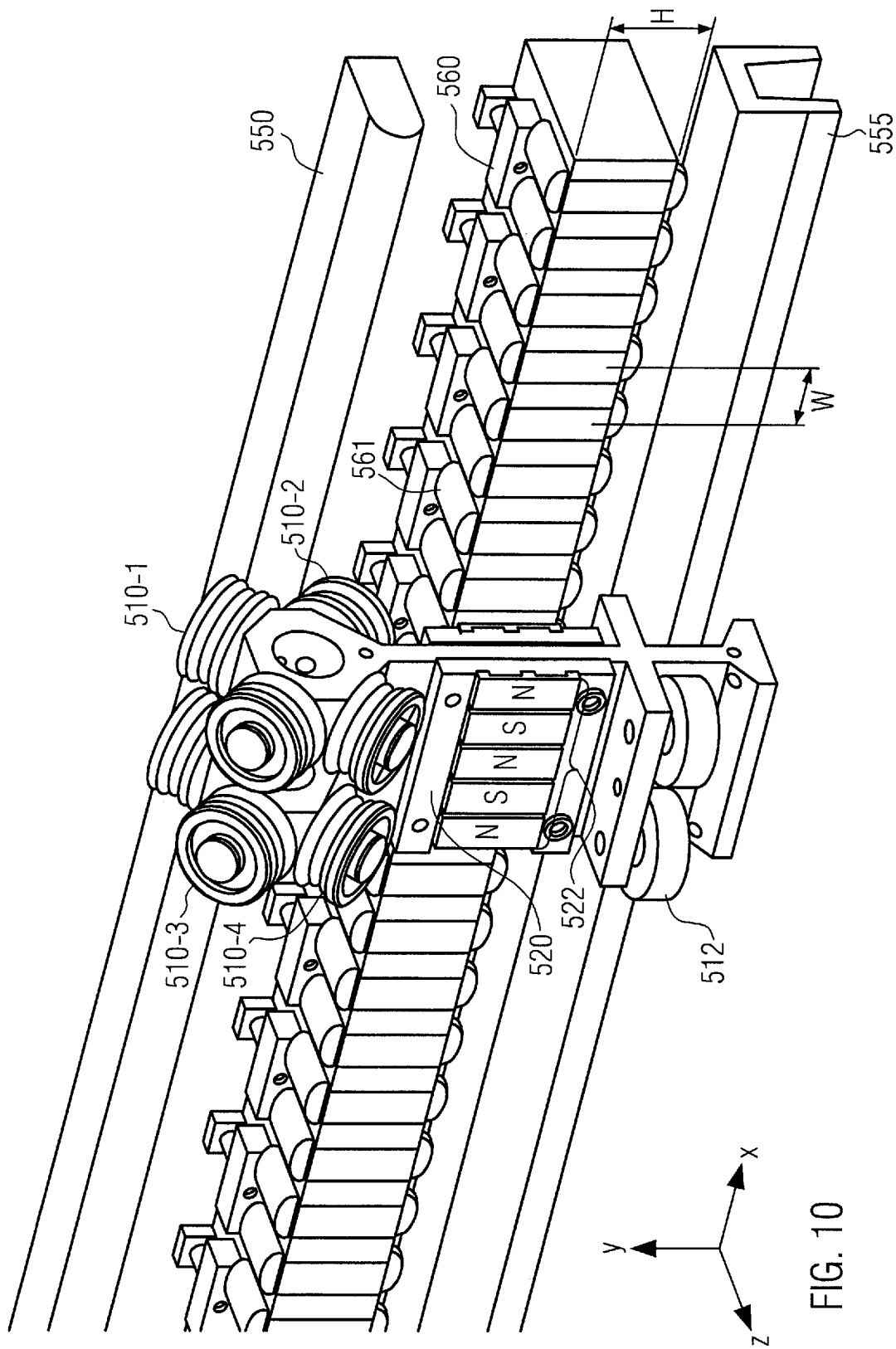
FIG. 10 shows the secondary part of a rotor of the prior art.

FIG. 10 shows a variation of a rotor according to the prior art shown in FIG. 1. As in FIG. 1, the rotor shown in FIG. 10 is also supported by track rollers 510-1 to 510-4 on an upper guide rail 550. In addition, the rotor in FIG. 10 has guide rollers 512 which guide the rotor on the lower guide rail 555. For the sake of clarity, only the rear guide rails 550 and 555 and the rear long stator 560 are shown here.

As shown schematically in FIG. 10, the long stator 560 comprises a series of coils 561 whose iron cores have a height H perpendicular to the direction of movement, i.e. in Y direction. The coils 561 are arranged at a distance W from each other along the long stator. The alternating magnetic fields of the coils 561 interact with the permanent magnets and/or non-switching electromagnets of the secondary part 520, which are arranged with alternating polarity N or S in a row, i.e. sequence 522, which secondary part is shown in the vertical configuration. The diagram in FIG. 10 shows that the expansion of the magnets 522 of the secondary part 520 in Y-direction corresponds to the height H of the iron cores of the coils 561. Instead of the non-limiting sequence of alternating poles shown here, a single magnet can also be used as the magnet of the secondary part 520.

Figure 11:
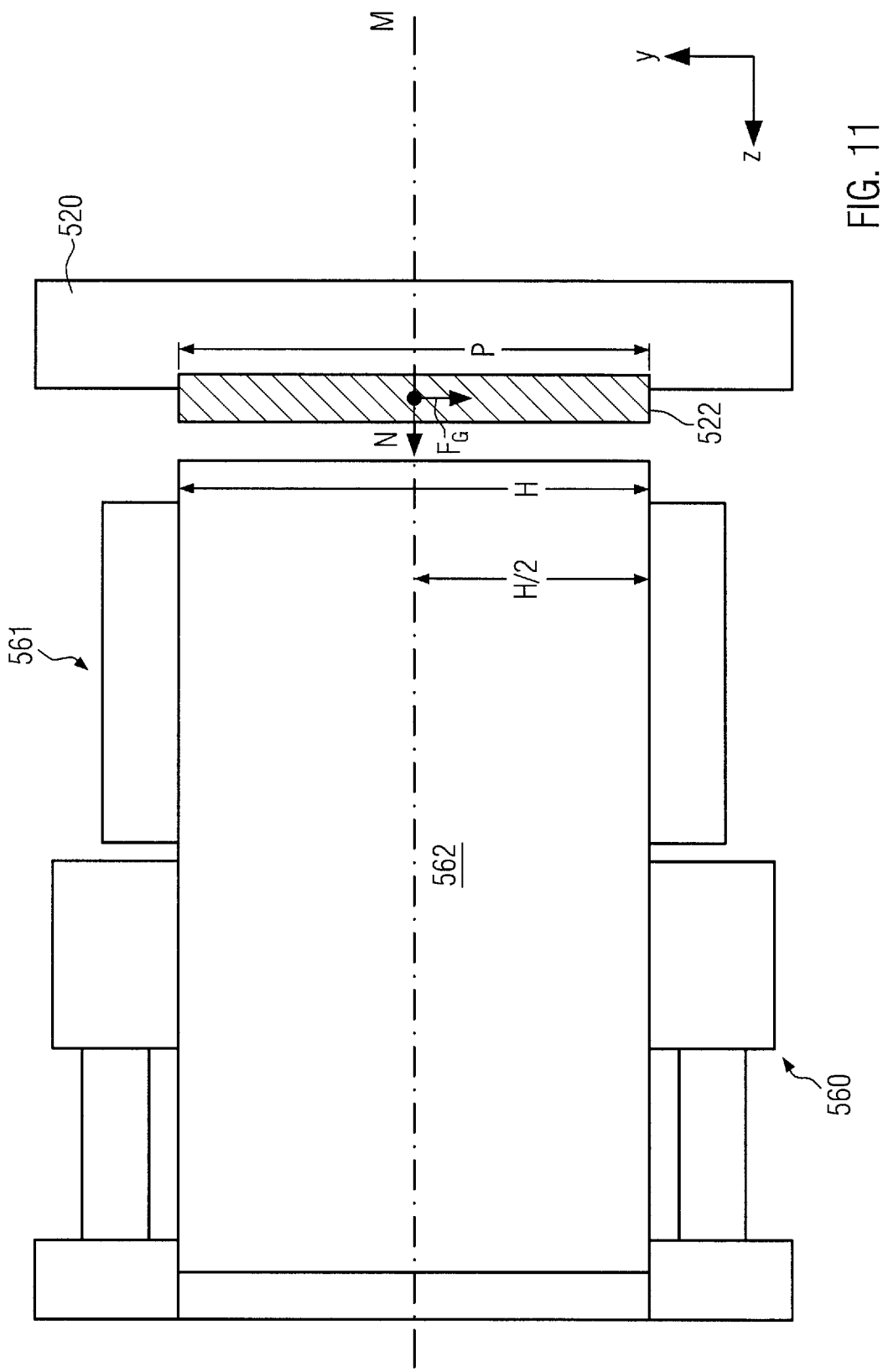
FIG. 11 schematically shows the relative arrangement of the magnets of the secondary part and the long stator for the rotor of FIG. 10.

FIG. 11 schematically shows the relative arrangement of the magnet(s) 522 of the secondary part 520 of the rotor of FIG. 10 and the iron core 562 of the coil 561 of the long stator 560. The iron core 562 and the magnets 522 of the secondary part 520 have the same height H in the prior art. In addition, the magnets 522 on the secondary part 520 are arranged symmetrically with respect to a median plane M of the long stator 560, which is indicated by the dashed line at half height H/2. Due to the symmetrical arrangement, the magnetic interaction force N acts perpendicular to the vertical, i.e. in Z-direction, and therefore has no influence on the gravity $F_G$ acting vertically downwards.

Figure 12:
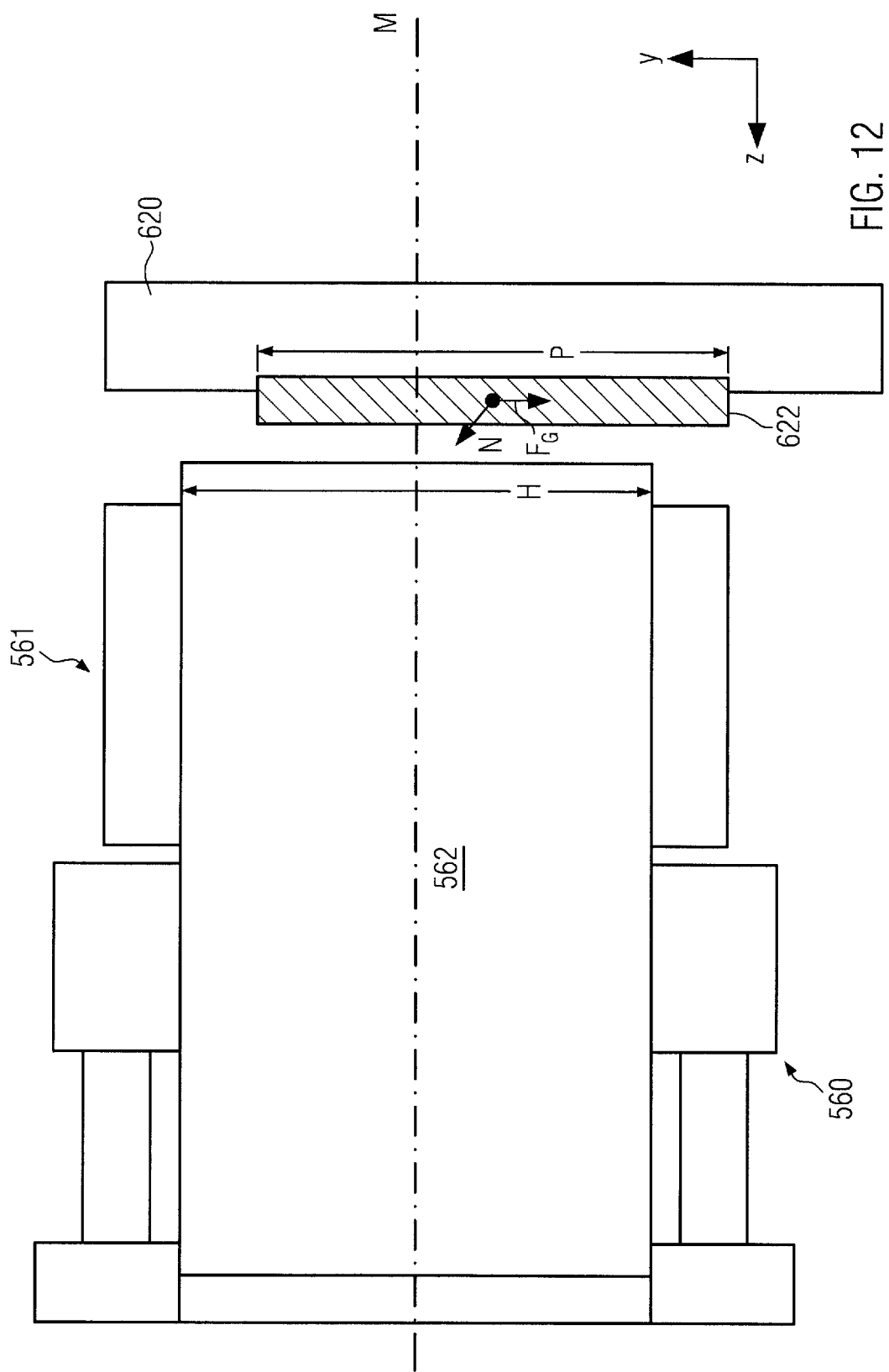
FIG. 12 schematically shows the relative arrangement of the magnets of the secondary part of a rotor according to the present invention.

In contrast to the symmetrical arrangement of the prior art, the magnet or magnets 622 of the secondary part 620 of a rotor according to the present invention are arranged asymmetrically with respect to the median plane M of the long stator 560, as schematically shown in FIG. 12. In the further development shown in FIG. 12, the magnets 622 are shifted downwards with respect to the median plane M. Since in this development the height P of the magnets 622, i.e. their vertical expansion, is equal to the height H of the iron core 562, the total overlap between the iron core 562 and the magnets 622 is reduced by shifting the magnets 622 downwards.

As a result, the secondary part which is paramagnetic due to the magnets 622 is no longer energetically in the optimum position, so that the magnetic interaction force N is now directed obliquely upwards, whereby the secondary part 620 is pulled into an energetically more favorable position. However, this is counteracted by the downward gravitational force $F_G$, so that although the secondary part 620 remains in its illustrated position, the weight force $F_G$, which acts on the rollers of the rotor, is reduced by the vertical component of the magnetic interaction force N. However, since the overlap between the magnets 622 and the iron core 562 is no longer complete, the propulsive force generated by the magnetic interaction between the long stator and the secondary part is also reduced.

Figure 13:
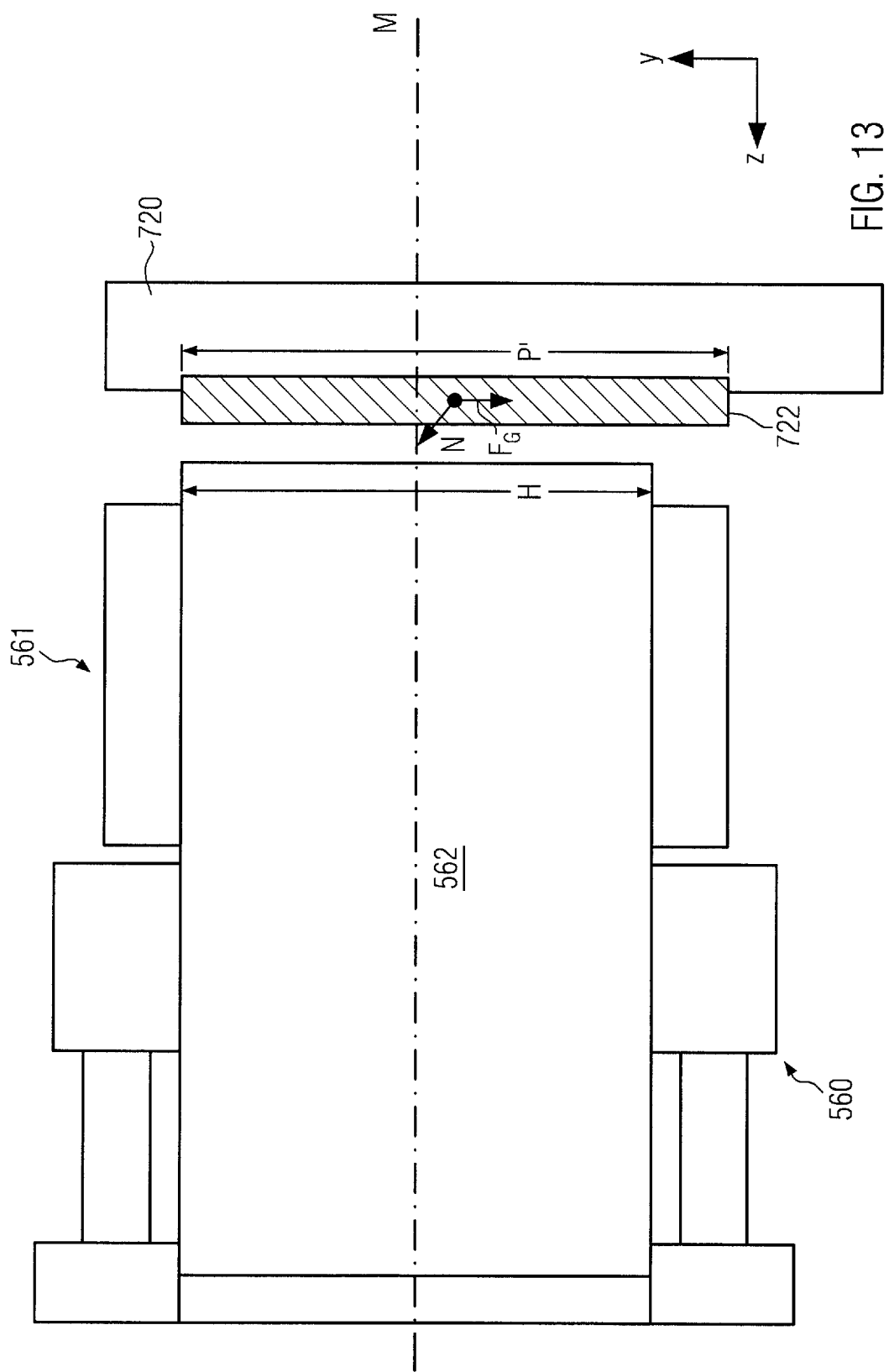
FIG. 13 schematically shows the relative arrangement of the magnets of the secondary part of another rotor according to the present invention.

This reduction can be avoided if, as shown schematically in FIG. 13, the magnets 722 of the secondary part 720 are formed with a greater height P' than the iron core 562. In the non-limiting development shown, the magnets 722 overlap completely with the iron core 562 and additionally project by a certain amount at the bottom beyond the iron core 562. As a result of this asymmetrical arrangement, the magnetic interaction force N is again directed obliquely upwards, which at least partially compensates the weight force $F_G$ directed vertically downwards. This also applies if the magnets of the secondary part 720 project both upwards and downwards beyond the iron core 562, but the lower projection is greater than the upper projection. With this development, a reduction in the weight force acting on the carrier rollers and thus in the mechanical wear of the carrier rollers can be achieved without loss of propulsive force.

Figure 14:
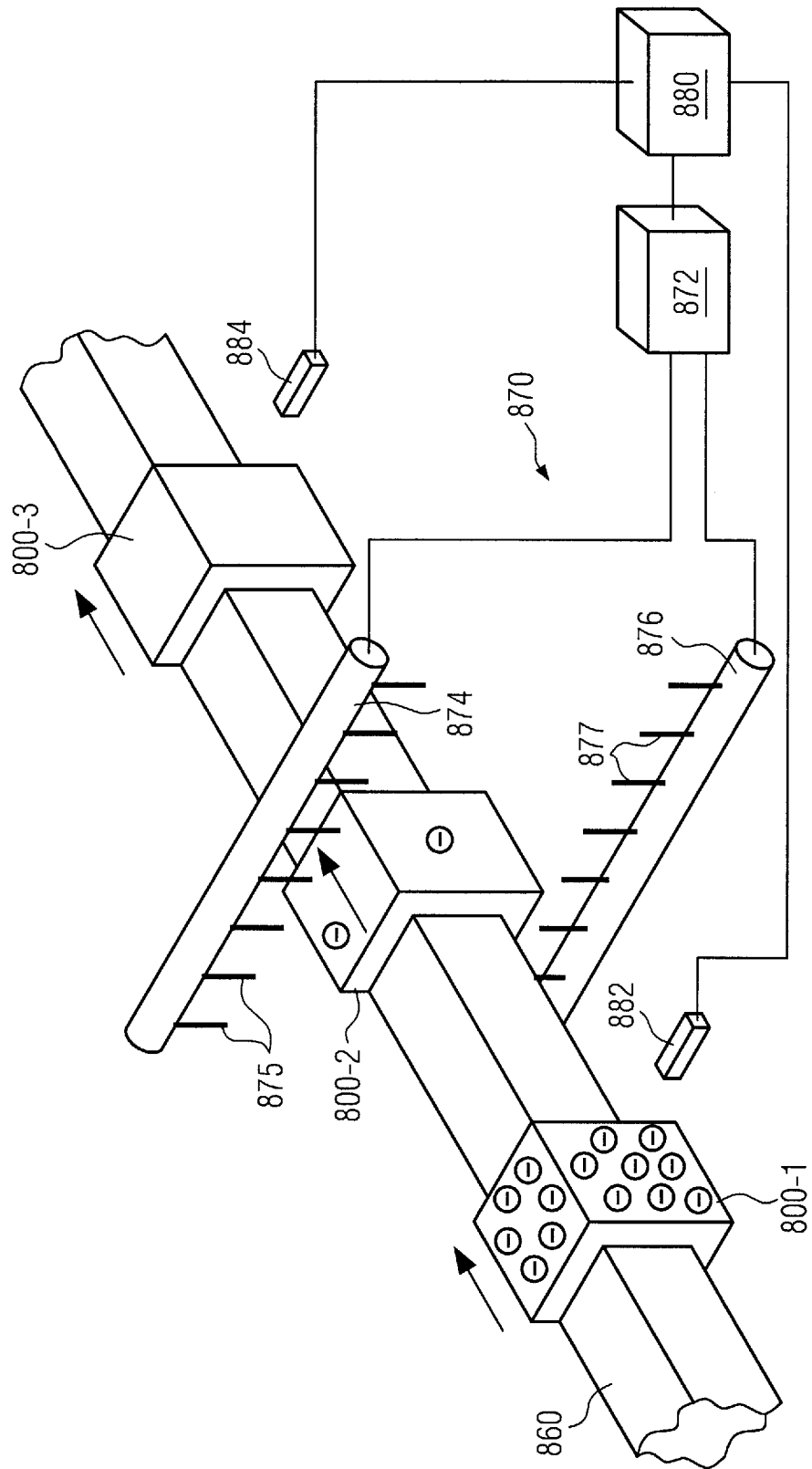
FIG. 14 schematically shows a three-dimensional representation of a long-stator linear motor system with discharge station according to the present invention.

FIG. 14 shows a three-dimensional representation of a long-stator linear motor system with a discharge station for contactless discharging or charging of rotors. The rotors 800-1 to 800-3 and the linear motor strand 860 as well as the transport path and guide rails are only schematically outlined.

Due to the frictional electricity generated by the movement of the rotors along the transport path, in particular the guide rails, the rotors are increasingly charged electrostatically. This is shown in FIG. 14 by way of example using the rotor 800-1 charged with negative charges. The electrostatic charging of the rotors can cause damage to persons or components in the event of uncontrolled discharge.

In order to discharge the rotors in a contactless manner, a discharge device 870 which is passed by the rotors 800-1 to be discharged is arranged at least one point of the transport path 860 according to the further development described here. In this development the discharge device 870 is designed as a high-voltage ionizer 872 with rod-shaped electrodes 874 and 876, which are arranged transversely to the direction of movement of the rotors 800-2 indicated by the arrows. The electrodes 874 and 876 have a series of tip electrodes 875 and 877 aligned in the direction of the rotors 800-2, on which ions are formed by corona discharge and field emission by ionizing the surrounding air. The high voltage ionizer 872 is designed in this development to generate positive ions, in particular, which neutralize the negative charges in contact with the surface of the rotor 800-2. After passing through the discharge station 870, the rotor 800-3 is thus freed of its electrostatic charge.

The non-limiting development shown in FIG. 14 further comprises a control device 880 and a potential sensor 882 arranged upstream of the discharge station 870, which is connected to the control device 880 via a signal line. By means of the potential sensor 882 arranged on the transport path 860, the polarity and the amount of electrostatic charge of the rotor 800-1 in the inlet to the discharge station 870 are determined and transmitted to the control device 880. This device, in turn, controls the high-voltage generator of the high-voltage ionizer 872 in such a way that the ions generated by the electrodes 875 and 877 are generated in sufficient quantity and polarity to completely neutralize the rotor 800-2 located in the area of the discharge station.

In addition, the development shown in FIG. 14 includes a further potential sensor 884 which is located downstream of the discharge station 870 and connected to the control device 880 via a signal line. This additional potential sensor 884 can be used to monitor the discharge success so that the control device 880 can control the high-voltage generator 872 as a function of the signal measured by the potential sensor 884.

As mentioned above, the high voltage ionizer 870 can also be used to selectively apply charge to uncharged rotors (not shown). In this case, the amount of charge applied can be controlled using the potential sensor 884. In particular, by specifically charging the rotors with rotor-specific charge quantities, it is possible to clearly identify individual rotors, for example for product tracking purposes, by means of potential sensors 884 arranged downstream of the discharge station 870.

The illustrated discharge device 870 works more reliably and requires less maintenance, since it is contactless, than the prior-art discharge devices based on mechanical contact. The described long-stator linear motor system thus achieves a longer service life and has lower maintenance costs.

Figure 15:
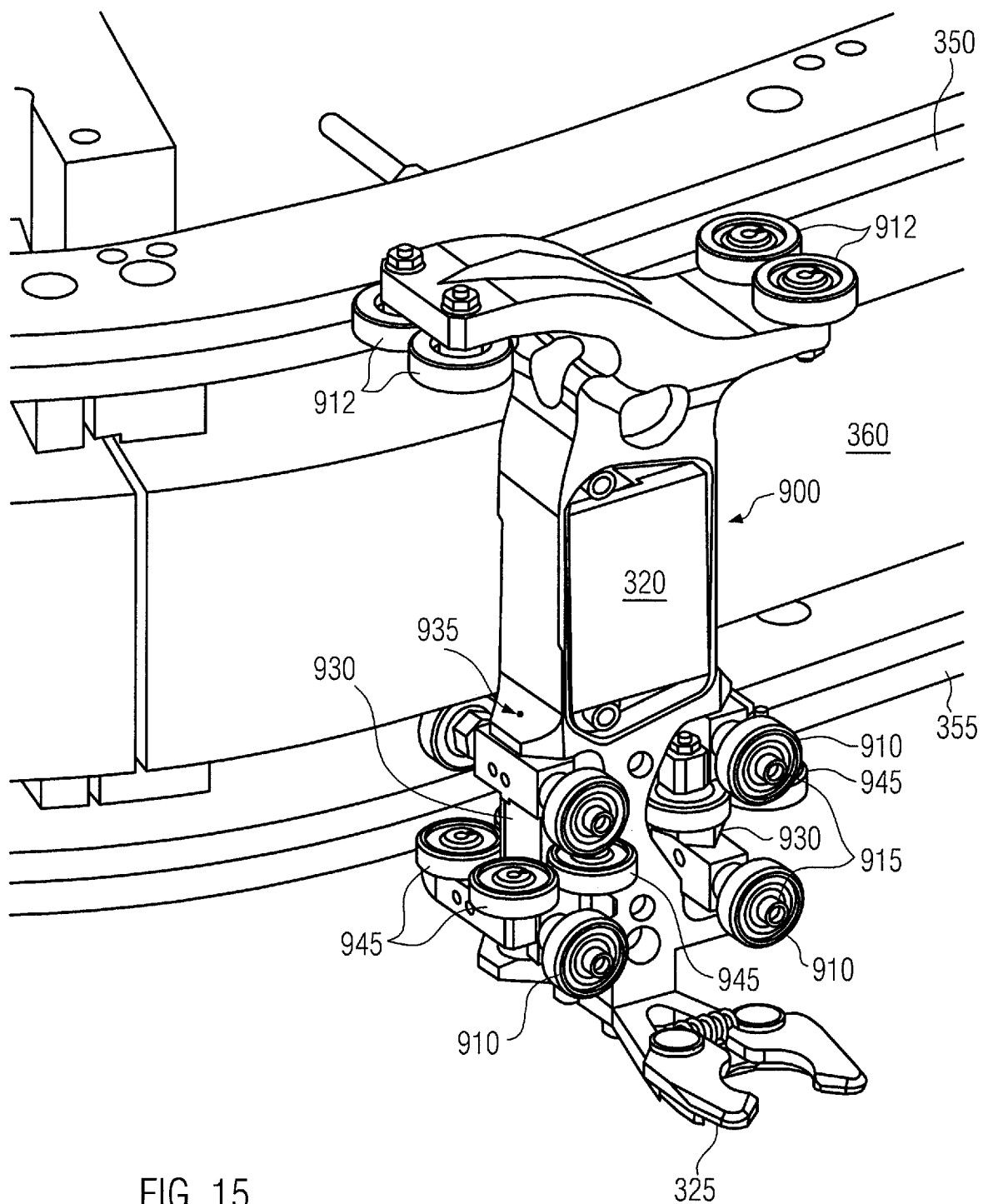
FIG. 15 shows an exemplary design of a rotor with rotatable bolster steering and pivotable guide element according to the present invention.

FIG. 15 finally shows an alternative further development of the rotatable bolster steering, whereby the change of the rotary positions of the rotatable bolsters is effected by means of guide rollers as guide elements.

The schematically shown rotor 900 is mounted on the guide rails 350 and 355 by means of guide rollers 912 and carrier rollers 910 and is moved by the interaction of the secondary part 320 with the long stator 360. In contrast to the guide rollers 912, whose roller axles are aligned perpendicular to the plane of movement, the roller axles 915 of the carrier rollers 910 are aligned parallel to the guide plane in this development. Thus, without steering, the well-known tracking error on the carrier rollers 910 would occur.

According to the development shown in FIG. 15, the automatic change in the rotary position of the rotatable bolster 930 on which the carrier rollers 910 are mounted is effected via guide rollers 945, which are also mounted on the respective rotatable bolster 930 and thus form a guide element 945 that can be pivoted in the guide plane. As an example, the figure shows four guide rollers arranged on a rotatable bolster 930. However, a single guide roller of this type is already sufficient as long as its axis of rotation is arranged offset in or against the direction of travel relative to the axis of rotation of the rotatable bolster.

A change in the curve radius, such as occurs during transition to cornering, thus causes the guide roller(s) 945 to pivot around the bearing bolt 935 of the rotatable bolster 930, which in turn leads to a change in the rotary position of the rotatable bolster 930. This causes an automatic correction of the tracking error of the carrier rollers 910 which are mounted on the rotatable bolster 930. The correction is optimal if the carrier rollers 910 are centered on the rotatable bolsters 930 in the direction of travel as shown in FIG. 15.

The invention claimed is:

1. A rotor for a long-stator linear motor system, comprising:
    at least two rollers for mounting the rotor on parallel guide rails of the long-stator linear motor system, wherein at least one of a) at least one pair of rollers of the at least two rollers is rotatably mounted to at least one rotatable bolster of the rotor, or b) at least one roller of the at least one pair of rollers comprises a steering rotational axis with an integrated castor;
    wherein the at least one roller is mounted on a roller axle by means of a bolt, via at least one of an asymmetric bore or a sloping bore; and
    wherein the at least one roller further comprises a pendulum ring mounted on the bolt, the pendulum ring having an external ball or slide bearing.

2. The rotor according to claim 1, further comprising:
    the at least one rotatable bolster; and
    at least one guide element which can be displaced perpendicular to a direction of travel or pivoted in a guide plane, wherein the at least one guide element is designed to maintain a constant distance from a guide rail or a control cam in engagement with the long-stator linear motor system;
    wherein the at least one rotatable bolster is connected to the at least one guide element in such a way that a displacement of the at least one guide element perpendicular to the direction of travel or a pivoting of the at least one guide element in the guide plane causes a change in a rotary position of the at least one rotatable bolster.

3. The rotor according to claim 2, wherein the at least one guide element comprises a guide roller, a sliding shoe or a guide pin.

4. The rotor according to claim 2, wherein the at least one rotatable bolster is connected to the at least one guide element via at least one connecting element, wherein the at least one connecting element is designed such that displacement of the at least one guide element during cornering toward an outside of a curve causes an alignment of the at least one rotatable bolster towards a curve radius.

5. The rotor according to claim 4, wherein the at least one rotatable bolster comprises two rotatable bolsters, wherein the at least one connecting element comprises an elastic rail or rod connecting the two rotatable bolsters together, wherein the elastic rail or rod is connected to the at least one guide element such that displacement of the at least one guide element causes an elastic deformation of the elastic rail or rod.

6. The rotor according to claim 4, wherein the at least one rotatable bolster comprises two rotatable bolsters, wherein the at least one connecting element comprises a rigid slide which interconnects the two rotatable bolsters in a positive manner, wherein the rigid slide is connected to the at least one guide element in such a way that a displacement of the at least one guide element causes a displacement of the rigid slide perpendicular to the direction of travel.

7. The rotor according to claim 6, wherein a relative position of a positive connection between the at least one rotatable bolster and a center of the rigid slide is selected such that a virtual axis connecting the pair of rollers is aligned in a direction of a curve radius of a curve with a predetermined curvature.

8. The rotor according to claim 1, wherein the at least two rollers have a concave roll-off profile configured such that the at least two rollers roll in a laterally stable manner on a surface of the parallel guide rails.

9. The rotor according to claim 1, wherein the roller axle of the at least one roller is arranged parallel or obliquely to a plane of movement of the rotor.

10. The rotor according to claim 1, wherein the at least one roller further comprises an outer ring mounted on the external ball or slide bearing.

11. The rotor according to claim 1, wherein the bolt is non-rotatably connected to the roller axle and the pendulum ring is rotatably mounted on the bolt.

12. The rotor according to claim 1, wherein the pendulum ring is non-rotatably connected to the bolt and the bolt is rotatably mounted on the roller axle.

13. The rotor according to claim 1, wherein an inner diameter of the pendulum ring is greater than a diameter of the roller axle by a predetermined amount, so that an annular gap is formed between the roller axle and the pendulum ring.

14. The rotor according to claim 13, wherein the pendulum ring is spaced from the roller axle by means of one or more spacer elements, by at least one of a) formation of the bolt as a stepped bolt, b) press fitting to the bolt, or c) adhesive bonding to the bolt.

15. The rotor according to claim 1, wherein the pendulum ring comprises recesses on an inside of the pendulum ring that permit oscillation about the roller axle.

16. A long-stator linear motor system, comprising:
a plurality of rotors, at least one rotor of the plurality of rotors comprising:
at least two rollers for mounting the at least one rotor on parallel guide rails of the long-stator linear motor system, wherein at least one of a) at least one pair of rollers of the at least two rollers is rotatably mounted to at least one rotatable bolster of the rotor, or b) at least one roller of the at least one pair of rollers comprises a steering rotational axis with an integrated castor;
wherein the at least one roller is mounted on a roller axle by means of a bolt, via at least one of an asymmetric bore or a sloping bore; and
wherein the at least one roller further comprises a pendulum ring mounted on the bolt, the pendulum ring having an external ball or slide bearing;
a transport path having at least two parallel guide rails on which the plurality of rotors are movably mounted, wherein a respective first roller of the pair of rollers of the at least one rotor is mounted on a first one of the at least two guide parallel rails and a respective second roller of the pair of rollers of the at least one rotor is mounted on a second one of the at least two parallel guide rails;
wherein the transport path comprises at least one of a) at least one straight piece and at least one curved piece or b) curved pieces with different radii of curvature.

17. The long-stator linear motor system of claim 16, wherein the at least one rotor further comprises:
the at least one rotatable bolster; and
at least one guide element which can be displaced perpendicular to a direction of travel or pivoted in a guide plane, wherein the at least one guide element is designed to maintain a constant distance from a guide rail or a control cam in engagement with the long-stator linear motor system;
wherein the at least one rotatable bolster is connected to the at least one guide element in such a way that a displacement of the at least one guide element perpendicular to the direction of travel or a pivoting of the at least one guide element in the guide plane causes a change in a rotary position of the at least one rotatable bolster.

18. The long-stator linear motor system of claim 17, wherein the at least one rotatable bolster is connected to the at least one guide element via at least one connecting element, wherein the at least one connecting element is designed such that displacement of the at least one guide element during cornering toward an outside of a curve causes an alignment of the at least one rotatable bolster towards a curve radius.

19. The long-stator linear motor system of claim 18, wherein the at least one rotatable bolster comprises two rotatable bolsters, wherein the at least one connecting element comprises an elastic rail or rod connecting the two rotatable bolsters together, wherein the elastic rail or rod connected to the at least one guide element such that displacement of the at least one guide element causes an elastic deformation of the elastic rail or rod.

20. The long-stator linear motor system of claim 18, wherein the at least one rotatable bolster comprises two rotatable bolsters, wherein the at least one connecting element comprises a rigid slide which interconnects the two rotatable bolsters in a positive manner, wherein the rigid slide is connected to the at least one guide element in such a way that a displacement of the at least one guide element causes a displacement of the rigid slide perpendicular to the direction of travel.

* * * * *